United States Patent
Das Sharma

(10) Patent No.: US 12,316,446 B2
(45) Date of Patent: May 27, 2025

(54) LATENCY OPTIMIZATION IN PARTIAL WIDTH LINK STATES

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 646 days.

(21) Appl. No.: 17/556,685

(22) Filed: Dec. 20, 2021

(65) Prior Publication Data

US 2022/0116138 A1  Apr. 14, 2022

(51) Int. Cl.
*H04L 1/00* (2006.01)
*G06F 13/40* (2006.01)

(52) U.S. Cl.
CPC ........ *H04L 1/0041* (2013.01); *G06F 13/4027* (2013.01)

(58) Field of Classification Search
CPC ... H04L 1/0061; H04L 1/0041; H04L 1/0072; H04L 1/0081; H04L 69/18; H04L 69/26
See application file for complete search history.

(56) References Cited

U.S. PATENT DOCUMENTS

| | | | |
|---|---|---|---|
| 2013/0007491 A1 | 1/2013 | Iyer et al. | |
| 2016/0373557 A1* | 12/2016 | Sikkink | H04L 69/22 |
| 2017/0322841 A1* | 11/2017 | Morris | G06F 11/1625 |
| 2018/0241506 A1* | 8/2018 | Kohda | H04L 1/0061 |
| 2020/0012555 A1 | 1/2020 | Sharma | |
| 2020/0226018 A1 | 7/2020 | Sharma | |
| 2020/0356496 A1 | 11/2020 | Iyer et al. | |
| 2021/0050941 A1 | 2/2021 | Das Sharma et al. | |
| 2021/0119730 A1 | 4/2021 | Sharma et al. | |
| 2022/0116138 A1 | 4/2022 | Sharma | |

FOREIGN PATENT DOCUMENTS

| | | |
|---|---|---|
| JP | 2017506378 A | 3/2017 |
| JP | 2020511030 A | 4/2020 |

OTHER PUBLICATIONS

Japan Patent Office; Office Action issued in Japanese Patent Application No. JP 2023-569594, dated Nov. 20, 2024; 10 pages including English translation.
Das Sharma, Debendra, "A Low Latency Approach to Delivering Alternate Protocols with Coherency and Memory Semantics Using PCI Express 6.0 PHY at 64.0 GT/s," 2021 IEEE Symposium on High-Performance Interconnects (HOTI), Oct. 1, 2021 (9 pages).
PCT International Search Report and Written Opinion in PCT International Application Serial No. PCT/US2022/050639 mailed on Mar. 20, 2023 (12 pages).

* cited by examiner

*Primary Examiner* — Shelly A Chase
(74) *Attorney, Agent, or Firm* — Alliance IP, LLC

(57) ABSTRACT

A first flit is generated according to a first flit format, where a first number of error detection codes are to be provided for an amount of data to be sent in the first flit, and the first flit is to be sent on a link by the transmitter while the link operates with a first link width. The link transitions from a first link width to a second link width, where the second link width is narrower than the first link width. A second flit is generated according to a second flit format based on the transition to the second link width, where the second flit is to be sent while the link operates at the second link width, and the second flit format defines that a second, higher number of error detection codes are to be provided for the same amount of data.

20 Claims, 18 Drawing Sheets

| Flit Hdr | S0 | S0 | S0 | S0 | S0 | S0 | S0 |
|---|---|---|---|---|---|---|---|
| S1 | S1 | S1 | S1 | S1 | S1 | S1 | S1 |
| S8 | crc0 | crc0 | S2 | S2 | S2 | S2 | S2 |
| S2 | S2 | S2 | S3 | S3 | S3 | S3 | S3 |
| S3 | S3 | S3 | S8 | S8 | crc1 | crc1 | crc1 |
| S4 | S4 | S4 | S4 | S4 | S4 | S4 | S4 |
| S5 | S5 | S5 | S5 | S5 | S5 | S5 | S5 |
| S8 | crc2 | crc2 | S6 | S6 | S6 | S6 | S6 |
| S6 | S6 | S6 | S7 | S7 | S7 | S7 | S7 |
| S7 | S7 | S7 | S8 | S8 | crc3 | crc3 | crc3 |
| S9 | S9 | S9 | S9 | S9 | S9 | S9 | S9 |
| S10 | S10 | S10 | S10 | S10 | S10 | S10 | S10 |
| S8 | crc4 | crc4 | S11 | S11 | S11 | S11 | S11 |
| S11 | S11 | S11 | S12 | S12 | S12 | S12 | S12 |
| S12 | S12 | S12 | S8 | S8 | crc5 | crc5 | crc5 |
| S13 | S13 | S13 | S13 | S13 | S13 | S13 | S13 |
| S14 | S14 | S14 | S14 | S14 | S14 | S14 | S14 |
| S8 | Rsvd | crc6 | crc6 | crc6 | fec0 | fec1 | fec2 |

| Flit Hdr | S0 | S0 | S0 | S0 | S0 | S0 | S0 |
|---|---|---|---|---|---|---|---|
| S1 | S1 | S1 | S1 | S1 | S1 | S1 | S1 |
| S8 | crc0 | crc0 | crc0 | S2 | S2 | S2 | S2 |
| S2 | S2 | S2 | S2 | S3 | S3 | S3 | S3 |
| S3 | S3 | S3 | S3 | S8 | crc1 | crc1 | crc1 |
| S4 | S4 | S4 | S4 | S4 | S4 | S4 | S4 |
| S5 | S5 | S5 | S5 | S5 | S5 | S5 | S5 |
| S8 | crc2 | crc2 | crc2 | S6 | S6 | S6 | S6 |
| S6 | S6 | S6 | S6 | S7 | S7 | S7 | S7 |
| S7 | S7 | S7 | S7 | S8 | crc3 | crc3 | crc3 |
| S9 | S9 | S9 | S9 | S9 | S9 | S9 | S9 |
| S10 | S10 | S10 | S10 | S10 | S10 | S10 | S10 |
| S8 | crc4 | crc4 | crc4 | S11 | S11 | S11 | S11 |
| S11 | S11 | S11 | S11 | S12 | S12 | S12 | S12 |
| S12 | S12 | S12 | S12 | S8 | crc5 | crc5 | crc5 |
| S13 | S13 | S13 | S13 | S13 | S13 | S13 | S13 |
| S14 | S14 | S14 | S14 | S14 | S14 | S14 | S14 |
| S8 | crc6 | crc6 | crc6 | S15 | S15 | S15 | S15 |
| S15 | S15 | S15 | S15 | S16 | S16 | S16 | S16 |
| S16 | S16 | S16 | S16 | S8 | crc7 | crc7 | crc7 |
| S17 | S17 | S17 | S17 | S17 | S17 | S17 | S17 |
| S18 | S18 | S18 | S18 | S18 | S18 | S18 | S18 |
| S8 | crc8 | crc8 | crc8 | S19 | S19 | S19 | S19 |
| S19 | S19 | S19 | S19 | S20 | S20 | S20 | S20 |
| S20 | S20 | S20 | S20 | S29 | crc9 | crc9 | crc9 |
| S21 | S21 | S21 | S21 | S21 | S21 | S21 | S21 |
| S22 | S22 | S22 | S22 | S22 | S22 | S22 | S22 |
| S29 | crc10 | crc10 | crc10 | S23 | S23 | S23 | S23 |
| S23 | S23 | S23 | S23 | S24 | S24 | S24 | S24 |
| S24 | S24 | S24 | S24 | S29 | crc11 | crc11 | crc11 |
| S25 | S25 | S25 | S25 | S25 | S25 | S25 | S25 |
| S26 | S26 | S26 | S26 | S26 | S26 | S26 | S26 |
| S29 | crc12 | crc12 | crc12 | S27 | S27 | S27 | S27 |
| S27 | S27 | S27 | S27 | S28 | S28 | S28 | S28 |
| S28 | S28 | S28 | S28 | S29 | S29 | S29 | S29 |
| Rsvd | Rsvd | crc13 | crc13 | crc13 | fec0 | fec1 | fec2 |

LATENCY OPTIMIZATION IN PARTIAL WIDTH LINK STATES

FIELD

This disclosure pertains to computing systems, and in particular (but not exclusively) to physical interconnects and related link protocols.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIGS. 12A-12C illustrate representations of example modified flit formats for use during partial width link conditions.

DETAILED DESCRIPTION

Figure 1:
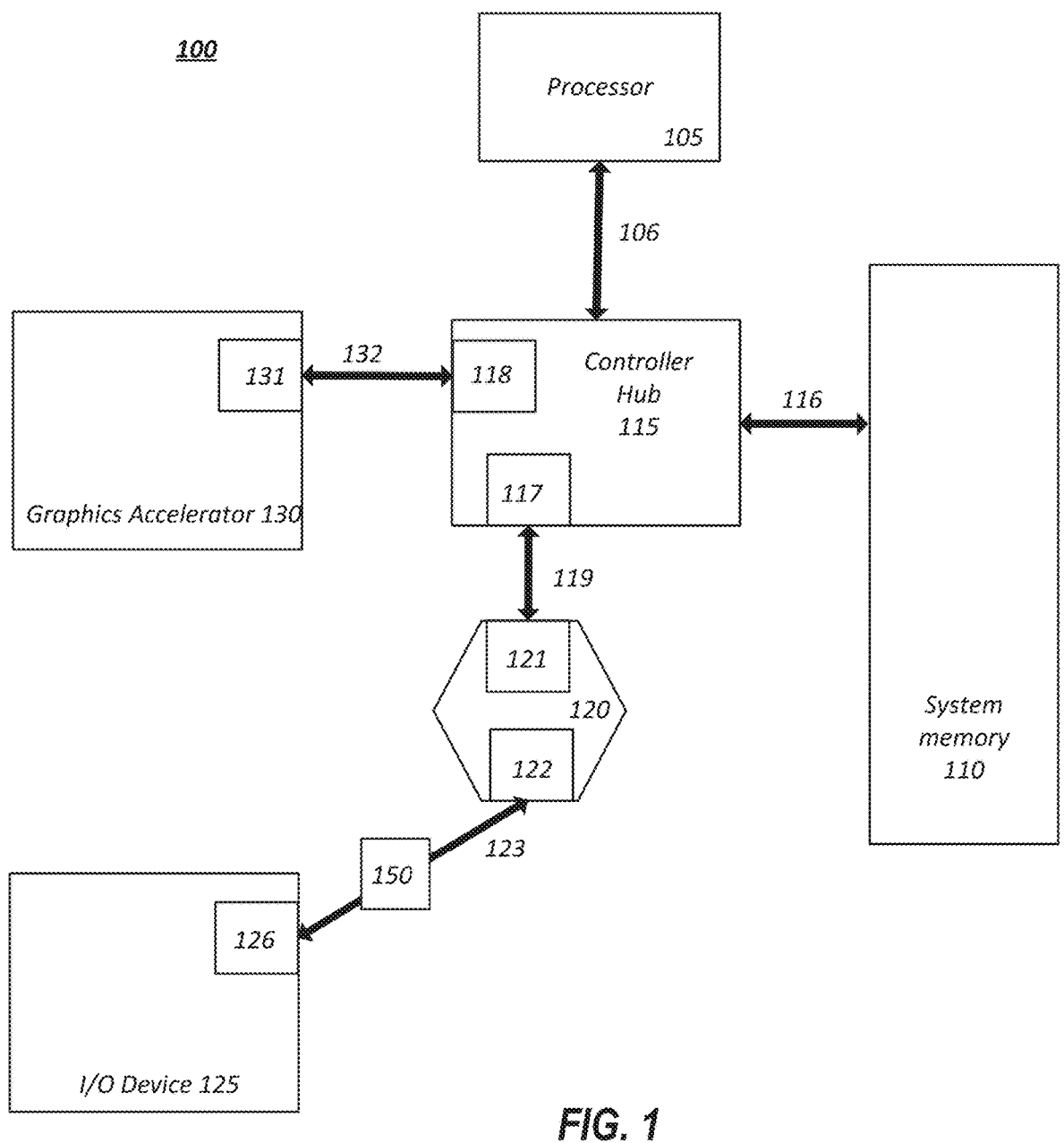
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the solutions provided in the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the solutions described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
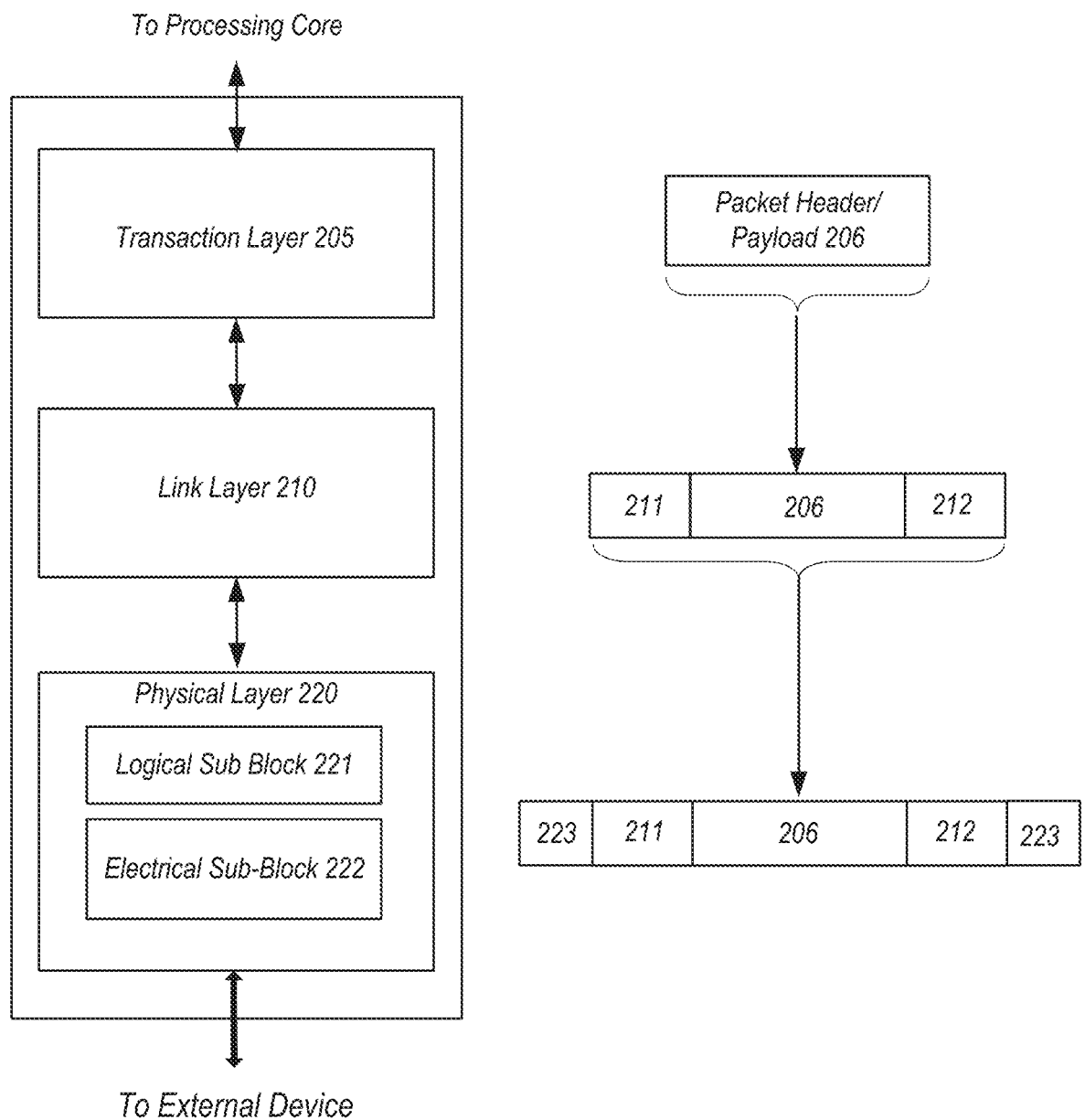
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
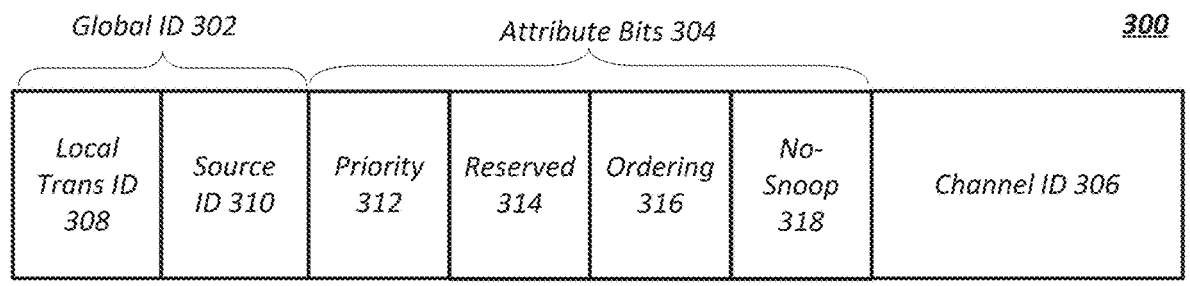
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/ interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
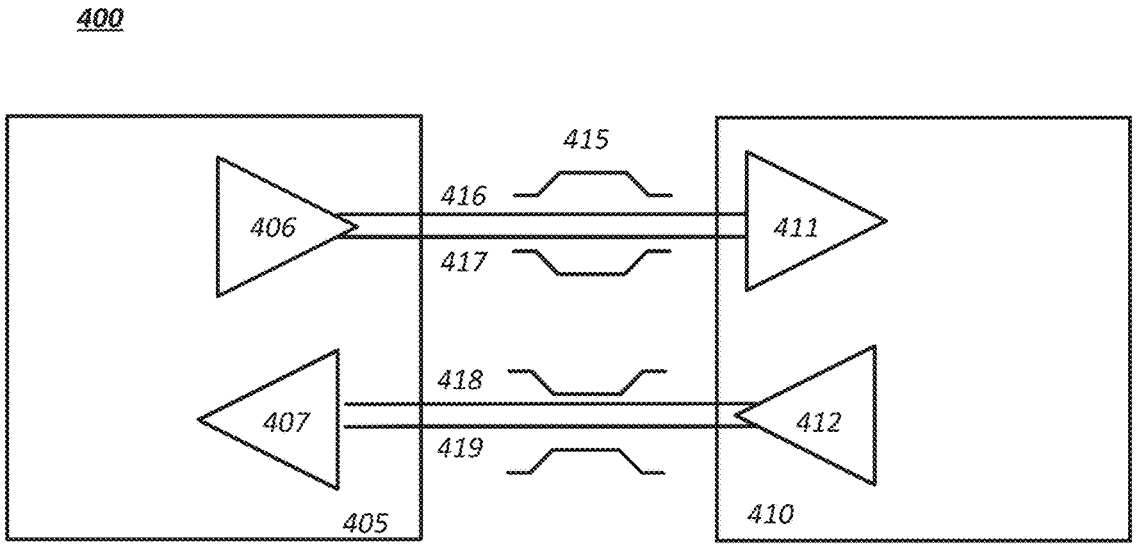
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. crosscoupling, voltage overshoot/undershoot, ringing, etc. This allows for better timing window, which enables faster transmission frequencies.

In one embodiment, Ultra Path Interconnect™ (UPI™) may be utilized to interconnect two or more devices. UPI can implement a next-generation cache-coherent, link-based interconnect. As one example, UPI may be utilized in high performance computing platforms, such as workstations or servers, including in systems where PCIe or another interconnect protocol is typically used to connect processors, accelerators, I/O devices, and the like. However, UPI is not so limited. Instead, UPI may be utilized in any of the systems or platforms described herein. Furthermore, the individual ideas developed may be applied to other interconnects and platforms, such as PCIe, MIPI, QPI, etc.

Figure 5:
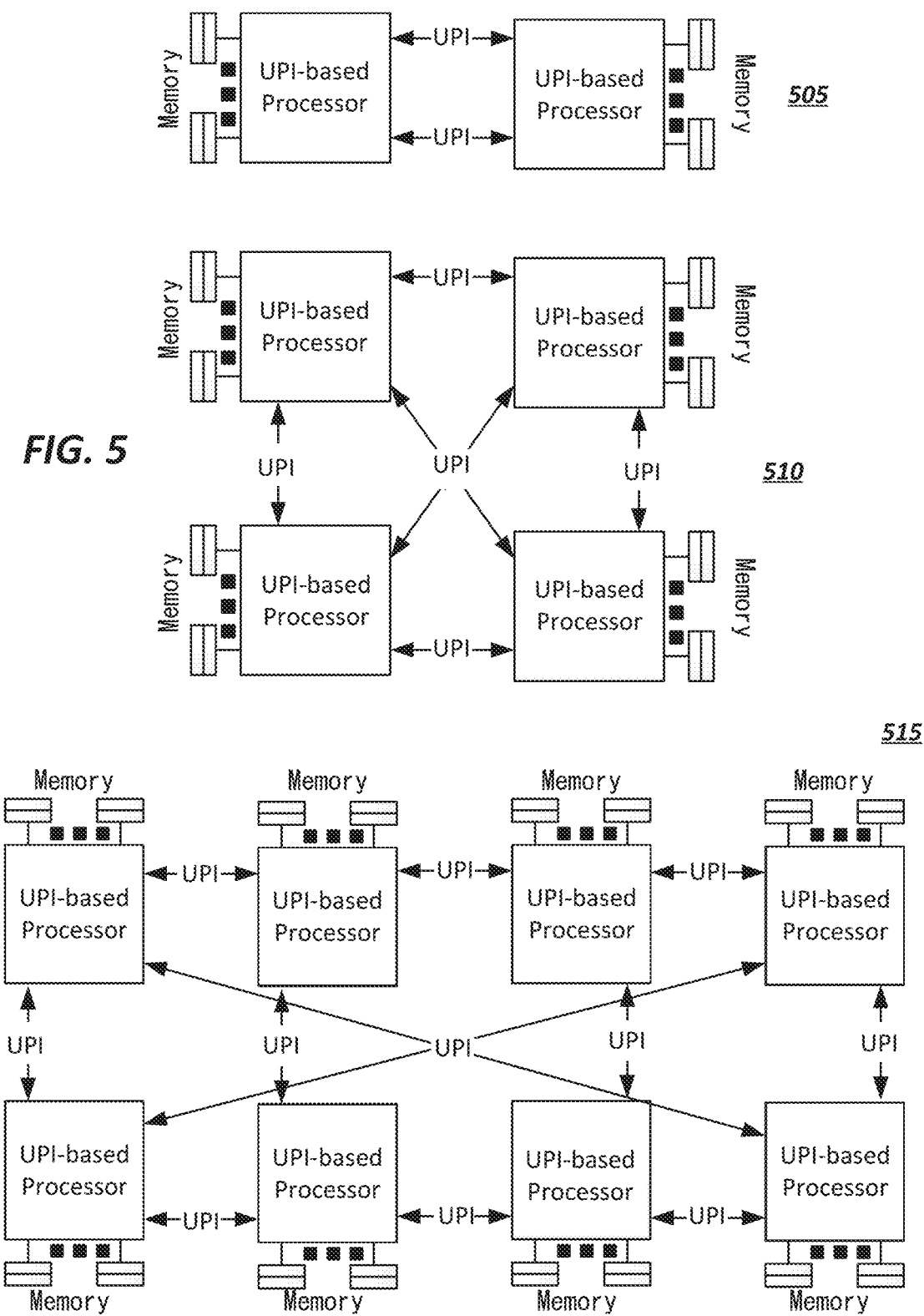
FIG. 5 illustrates embodiments of potential high performance, processor-to-processor interconnect configurations.

To support multiple devices, in one example implementation, UPI can include an Instruction Set Architecture (ISA) agnostic (i.e. UPI is able to be implemented in multiple different devices). In another scenario, UPI may also be utilized to connect high performance I/O devices, not just processors or accelerators. For example, a high performance PCIe device may be coupled to UPI through an appropriate translation bridge (i.e. UPI to PCIe). Moreover, the UPI links may be utilized by many UPI based devices, such as processors, in various ways (e.g. stars, rings, meshes, etc.). FIG. 5 illustrates example implementations of multiple potential multi-socket configurations. A two-socket configuration 505, as depicted, can include two UPI links; however, in other implementations, one UPI link may be utilized. For larger topologies, any configuration may be utilized as long as an identifier (ID) is assignable and there is some form of virtual path, among other additional or substitute features. As shown, in one example, a four socket configuration 510 has an UPI link from each processor to another. But in the eight socket implementation shown in configuration 515, not every socket is directly connected to each other through an UPI link. However, if a virtual path or channel exists between the processors, the configuration is supported. A range of supported processors includes 2-32 in a native domain. Higher numbers of processors may be reached through use of multiple domains or other interconnects between node controllers, among other examples.

The UPI architecture includes a definition of a layered protocol architecture, including in some examples, protocol layers (coherent, non-coherent, and, optionally, other memory based protocols), a routing layer, a link layer, and a physical layer. Furthermore, UPI can further include enhancements related to power managers (such as power control units (PCUs)), design for test and debug (DFT), fault handling, registers, security, among other examples. FIG. 5 illustrates an embodiment of an example UPI layered protocol stack. In some implementations, at least some of the layers illustrated in FIG. 5 may be optional. Each layer deals with its own level of granularity or quantum of information (the protocol layer 620a,b with packets 630, link layer 610a,b with flits 635, and physical layer 605a,b with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610a,b is capable of embedding multiple pieces of different transactions in a single flit, and one or multiple headers (e.g. 1, 2, 3, 4) may be embedded within the flit. In one example, UPI splits the headers into corresponding slots to enable multiple messages in the flit destined for different nodes.

Physical layer 605a,b, in one embodiment, can be responsible for the fast transfer of information on the physical medium (electrical or optical etc.). The physical link can be point-to-point between two Link layer entities, such as layer 605a and 605b. The Link layer 610a,b can abstract the Physical layer 605a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 620a,b relies on the Link layer 610a,b to map protocol messages into the appropriate message classes and virtual channels before handing them to the Physical layer 605a,b for transfer across the physical links. Link layer 610a,b may support multiple messages, such as a request, snoop, response, writeback, non-coherent data, among other examples.

Figure 6:
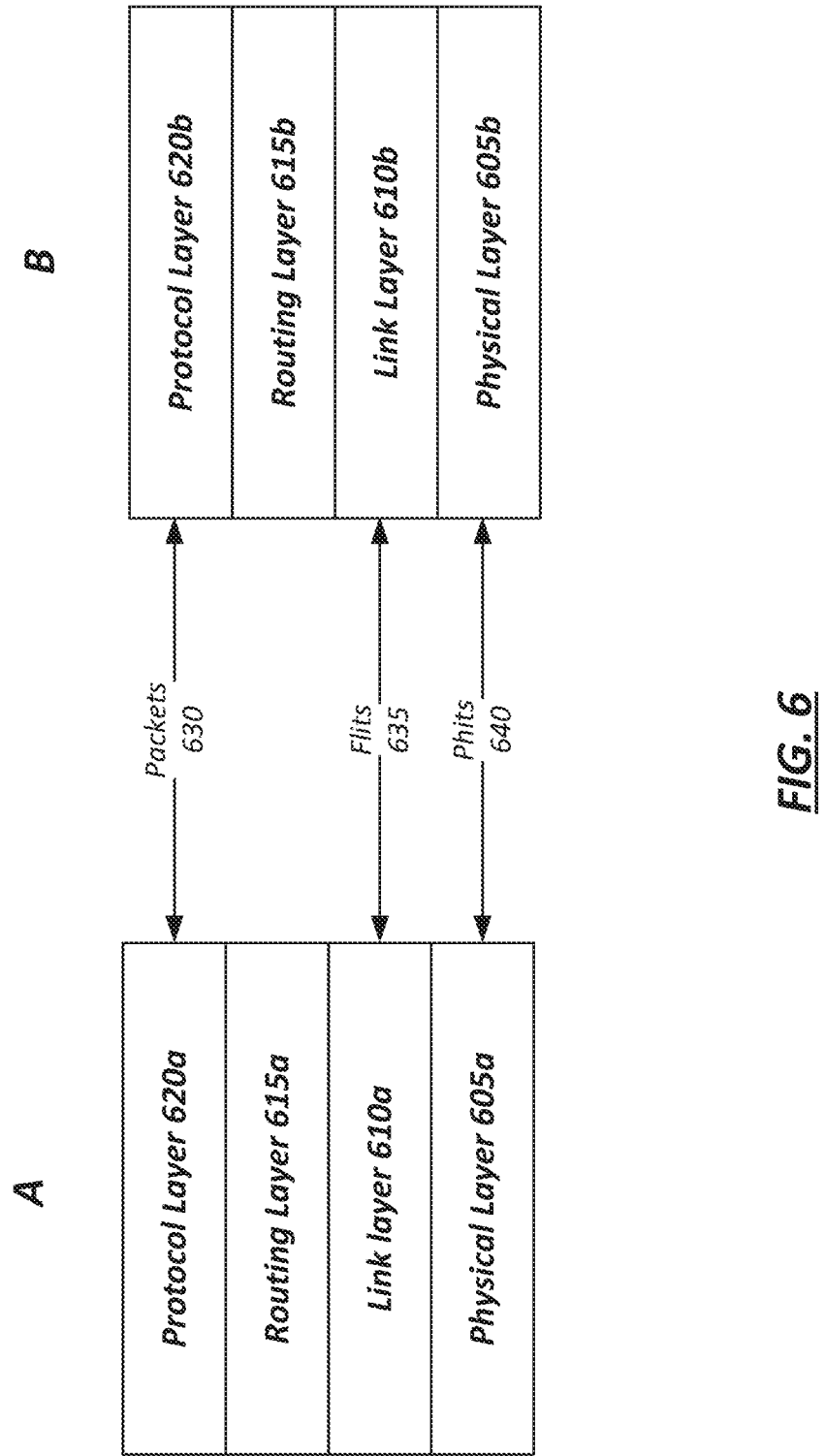
FIG. 6 illustrates an embodiment of a layered protocol stack associated with an interconnect.

The Physical layer 605a,b (or PHY) of UPI can be implemented above the electrical layer (i.e. electrical conductors connecting two components) and below the link layer 610a,b, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 605*a,b*, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610*a,b* can be implemented so as to provide reliable data transfer between two protocol or routing entities. The Link layer can abstract Physical layer 605*a,b* from the Protocol layer 620*a,b*, and can be responsible for the flow control between two protocol agents (A, B), and provide virtual channel services to the Protocol layer (Message Classes) and Routing layer (Virtual Networks). The interface between the Protocol layer 620*a,b* and the Link Layer 610*a,b* can typically be at the packet level. In one embodiment, the smallest transfer unit at the Link Layer is referred to as a flit which a specified number of bits, such as 192 bits or some other denomination. The Link Layer 610*a,b* relies on the Physical layer 605*a,b* to frame the Physical layer's 605*a,b* unit of transfer (phit) into the Link Layer's 610*a,b* unit of transfer (flit). In addition, the Link Layer 610*a,b* may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615*a,b* can provide a flexible and distributed method to route UPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a UPI packet into the UPI fabric. The lookup at an intermediate router may be used to route an UPI packet from an input port to an output port. The lookup at a destination port may be used to target the destination UPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615*a,b* relies on the Link layer 610*a,b* for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In one embodiment, UPI can include a Coherence Protocol layer 620*a,b* to support agents caching lines of data from memory. An agent wishing to cache memory data may use the coherence protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request. Lastly, an agent may fulfill external requests to invalidate a line in its cache. The protocol ensures coherency of the data by dictating the rules all caching agents may follow. It also provides the means for agents without caches to coherently read and write memory data.

The optimization implementations discussed herein may be applied to flits and packet structures of various protocols, including PCIe and UPI. Such features and improvements may be applied to still other protocols. For instance, the features discussed herein may be applied to a Compute Express Link (CXL) interconnect protocol designed to provide an improved, high-speed CPU-to-device and CPU-to-memory interconnect designed to accelerate next-generation data center performance, among other application. CXL maintains memory coherency between the CPU memory space and memory on attached devices, which allows resource sharing for higher performance, reduced software stack complexity, and lower overall system cost, among other example advantages. CXL enables communication between host processors (e.g., CPUs) and a set of workload accelerators (e.g., graphics processing units (GPUs), field programmable gate array (FPGA) devices, tensor and vector processor units, machine learning accelerators, purpose-built accelerator solutions, among other examples). Indeed, CXL is designed to provide a standard interface for high-speed communications, as accelerators are increasingly used to complement CPUs in support of emerging computing applications such as artificial intelligence, machine learning and other applications.

A CXL link may be a low-latency, high-bandwidth discrete or on-package link that supports dynamic protocol multiplexing of coherency, memory access, and input/output (I/O) protocols. Among other applications, a CXL link may enable an accelerator to access system memory as a caching agent and/or host system memory, among other examples. CXL is a dynamic multi-protocol technology designed to support a vast spectrum of accelerators. CXL provides a rich set of protocols that include I/O semantics similar to PCIe (CXL.io), caching protocol semantics (CXL.cache), and memory access semantics (CXL.mem) over a discrete or on-package link. Based on the particular accelerator usage model, all of the CXL protocols or only a subset of the protocols may be enabled. In some implementations, CXL may be built upon the well-established, widely adopted PCIe infrastructure (e.g., PCIe 5.0), leveraging the PCIe physical and electrical interface to provide advanced protocol in areas include I/O, memory protocol (e.g., allowing a host processor to share memory with an accelerator device), and coherency interface.

Figure 7:
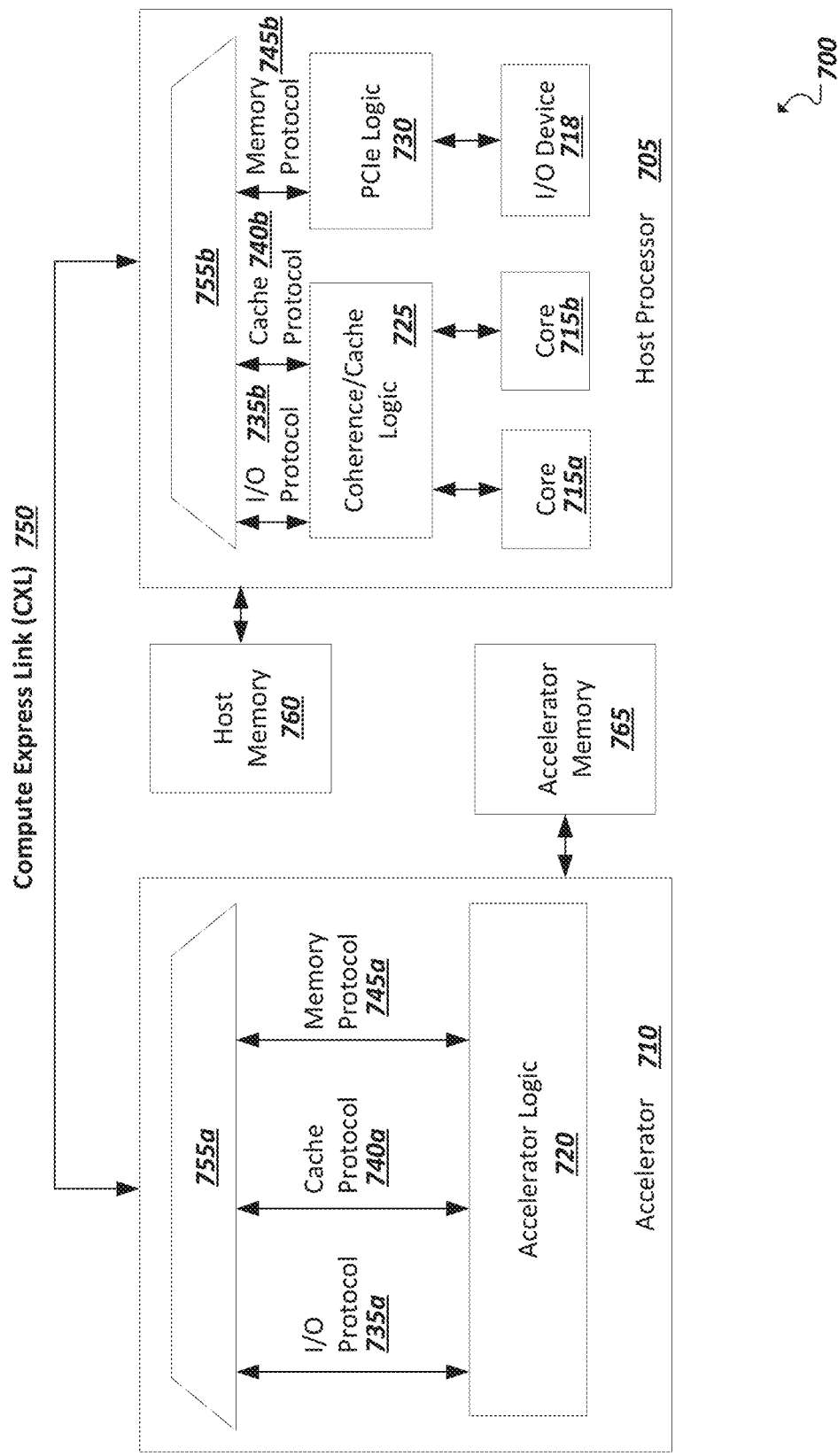
FIG. 7 illustrates a simplified block diagram of an example computing system utilizing a link compliant with a Compute Express Link (CXL)-based protocol.

Turning to FIG. 7, a simplified block diagram 700 is shown illustrating an example system utilizing a CXL link 750. For instance, the link 750 may interconnect a host processor 705 (e.g., CPU) to an accelerator device 710. In this example, the host processor 705 includes one or more processor cores (e.g., 715*a-b*) and one or more I/O devices (e.g., 718). Host memory (e.g., 760) may be provided with the host processor (e.g., on the same package or die). The accelerator device 710 may include accelerator logic 720 and, in some implementations, may include its own memory (e.g., accelerator memory 765). In this example, the host processor 705 may include circuitry to implement coherence/cache logic 725 and interconnect logic (e.g., PCIe logic 730). CXL multiplexing logic (e.g., 755*a-b*) may also be provided to enable multiplexing of CXL protocols (e.g., I/O protocol 735*a-b* (e.g., CXL.io), caching protocol 740*a-b* (e.g., CXL.cache), and memory access protocol 745*a-b* (CXL.mem)), thereby enabling data of any one of the supported protocols (e.g., 735*a-b*, 740*a-b*, 745*a-b*) to be sent, in a multiplexed manner, over the link 750 between host processor 705 and accelerator device 710.

In some implementations, a Flex Bus port may be utilized in concert with CXL-compliant links to flexibly adapt a device to interconnect with a wide variety of other devices (e.g., other processor devices, accelerators, switches, memory devices, etc.). A Flex Bus port is a flexible high-speed port that is statically configured to support either a PCIe or CXL link (and potentially also links of other protocols and architectures). A Flex Bus port allows designs to choose between providing native PCIe protocol or CXL over a high-bandwidth, off-package link. Selection of the protocol applied at the port may happen during boot time via auto negotiation and be based on the device that is plugged into the slot. Flex Bus uses PCIe electricals, making it compatible with PCIe retimers, and adheres to standard PCIe form factors for an add-in card.

Figure 8:
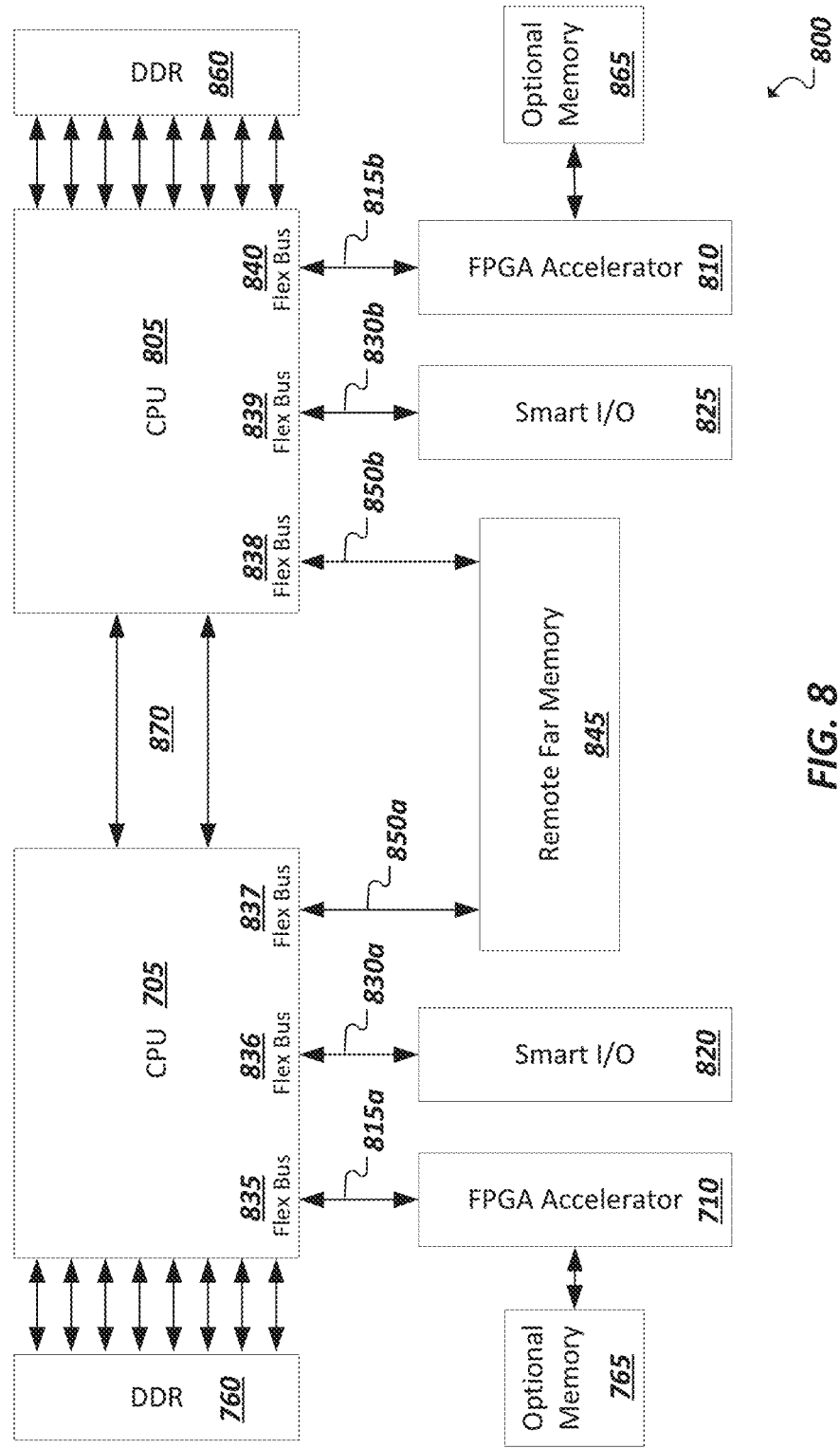
FIG. 8 illustrates a simplified block diagram of an example system including multiple integrated circuit blocks.

Turning to FIG. 8, an example is shown (in simplified block diagram 800) of a system utilizing Flex Bus ports (e.g., 835-640) to implement CXL (e.g., 815*a-b*, 850*a-b*) and PCIe links (e.g., 830*a-b*) to couple a variety of devices (e.g., 710, 810, 820, 825, 845, etc.) to a host processor (e.g., CPU 705, 805). In this example, a system may include two CPU host processor devices (e.g., 705, 805) interconnected by an inter-processor link 870 (e.g., utilizing a UltraPath Interconnect (UPI), Infinity Fabric™, or other interconnect protocol). Each host processor device 705, 805 may be coupled to local system memory blocks 760, 860 (e.g., double data rate (DDR) memory devices), coupled to the respective host processor 705, 805 via a memory interface (e.g., memory bus or other interconnect).

As discussed above, CXL links (e.g., 815*a*, 850*b*) may be utilized to interconnect a variety of accelerator devices (e.g., 710, 810). Accordingly, corresponding ports (e.g., Flex Bus ports 835, 840) may be configured (e.g., CXL mode selected) to enable CXL links to be established and interconnect corresponding host processor devices (e.g., 705, 805) to accelerator devices (e.g., 710, 810). As shown in this example, Flex Bus ports (e.g., 836, 839), or other similarly configurable ports, may be configured to implement general purpose I/O links (e.g., PCIe links) 830*a-b* instead of CXL links, to interconnect the host processor (e.g., 705, 805) to I/O devices (e.g., smart I/O devices 820, 825, etc.). In some implementations, memory of the host processor 705 may be expanded, for instance, through the memory (e.g., 765, 865) of connected accelerator devices (e.g., 710, 810), or memory extender devices (e.g., 845, connected to the host processor (s) 705, 805 via corresponding CXL links (e.g., 850*a-b*) implemented on Flex Bus ports (837, 838), among other example implementations and architectures.

Figure 9:
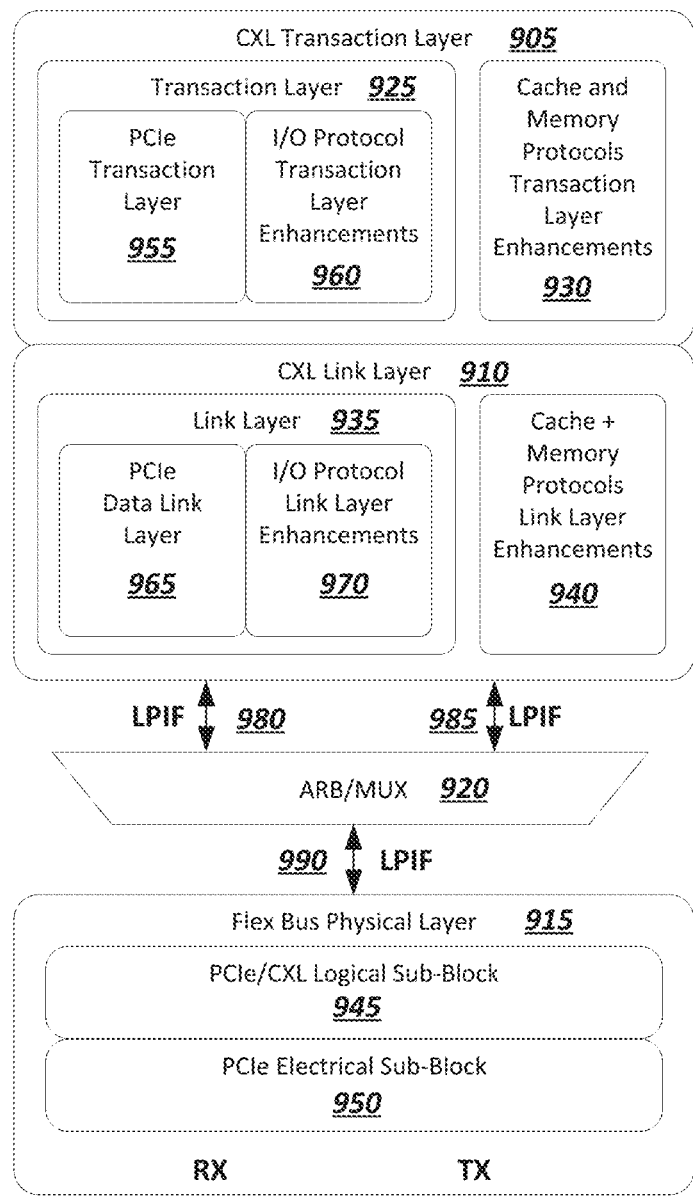
FIG. 9 illustrates a simplified block diagram of example protocol circuitry.

FIG. 9 is a simplified block diagram illustrating an example port architecture 900 (e.g., Flex Bus) utilized to implement CXL links. For instance, Flex Bus architecture may be organized as multiple layers to implement the multiple protocols supported by the port. For instance, the port may include transaction layer logic (e.g., 905), link layer logic (e.g., 910), and physical layer logic (e.g., 915) (e.g., implemented all or in-part in circuitry). For instance, a transaction (or protocol) layer (e.g., 905) may be subdivided into transaction layer logic 925 that implements a PCIe transaction layer 955 and CXL transaction layer enhancements 960 (for CXL.io) of a base PCIe transaction layer 955, and logic 930 to implement cache (e.g., CXL-.cache) and memory (e.g., CXL.mem) protocols for a CXL link. Similarly, link layer logic 935 may be provided to implement a base PCIe data link layer 965 and a CXL link layer (for CXl.io) representing an enhanced version of the PCIe data link layer 965. A CXL link layer 910 may also include cache and memory link layer enhancement logic 940 (e.g., for CXL.cache and CXL.mem).

Continuing with the example of FIG. 9, a CXL link layer logic 910 may interface with CXL arbitration/multiplexing (ARB/MUX) logic 920, which interleaves the traffic from the two logic streams (e.g., PCIe/CXL.io and CXL.cache/CXL.mem), among other example implementations. During link training, the transaction and link layers are configured to operate in either PCIe mode or CXL mode. In some instances, a host CPU may support implementation of either PCIe or CXL mode, while other devices, such as accelerators, may only support CXL mode, among other examples. In some implementations, the port (e.g., a Flex Bus port) may utilize a physical layer 915 based on a PCIe physical layer (e.g., PCIe electrical PHY 950). For instance, a Flex Bus physical layer may be implemented as a converged logical physical layer 945 that can operate in either PCIe mode or CXL mode based on results of alternate mode negotiation during the link training process. In some implementations, the physical layer may support multiple signaling rates (e.g., 8 GT/s, 16 GT/s, 32 GT/s, etc.) and multiple link widths (e.g., x16, x8, x4, x2, x1, etc.). In PCIe mode, links implemented by the port 900 may be fully compliant with native PCIe features (e.g., as defined in the PCIe specification), while in CXL mode, the link supports all features defined for CXL. Accordingly, a Flex Bus port may provide a point-to-point interconnect that can transmit native PCIe protocol data or dynamic multi-protocol CXL data to provide I/O, coherency, and memory protocols, over PCIe electricals, among other examples.

The CXL I/O protocol, CXL.io, provides a non-coherent load/store interface for I/O devices. Transaction types, transaction packet formatting, credit-based flow control, virtual channel management, and transaction ordering rules in CXL.io may follow all or a portion of the PCIe definition. CXL cache coherency protocol, CXL.cache, defines the interactions between the device and host as a number of requests that each have at least one associated response message and sometimes a data transfer. The interface consists of three channels in each direction: Request, Response, and Data.

The CXL memory protocol, CXL.mem, is a transactional interface between the processor and memory and uses the physical and link layers of CXL when communicating across dies. CXL.mem can be used for multiple different memory attach options including when a memory controller is located in the host CPU, when the memory controller is within an accelerator device, or when the memory controller is moved to a memory buffer chip, among other examples. CXL.mem may be applied to transaction involving different memory types (e.g., volatile, persistent, etc.) and configurations (e.g., flat, hierarchical, etc.), among other example features. In some implementations, a coherency engine of the host processor may interface with memory using CXL.mem requests and responses. In this configuration, the CPU coherency engine is regarded as the CXL.mem Master and the Mem device is regarded as the CXL.mem Subordinate. The CXL.mem Master is the agent which is responsible for sourcing CXL.mem requests (e.g., reads, writes, etc.) and a CXL.mem Subordinate is the agent which is responsible for responding to CXL.mem requests (e.g., data, completions, etc.). When the Subordinate is an accelerator, CXL.mem protocol assumes the presence of a device coherency engine (DCOH). This agent is assumed to be responsible for implementing coherency related functions such as snooping of device caches based on CXL.mem commands and update of metadata fields. In implementations, where metadata is supported by device-attached memory, it can be used by the host to implement a coarse snoop filter for CPU sockets, among other example uses.

In some implementations, an interface may be provided to couple circuitry or other logic (e.g., an intellectual property (IP) block or other hardware element) implementing a link layer (e.g., 910) to circuitry or other logic (e.g., an IP block or other hardware element) implementing at least a portion of a physical layer (e.g., 915) of a protocol. For instance, an interface based on a Logical PHY Interface (LPIF) specification to define a common interface between a link layer controller, module, or other logic and a module implementing a logical physical layer ("logical PHY" or "logPHY") to facilitate interoperability, design and validation re-use between one or more link layers and a physical layer for an interface to a physical interconnect, such as in the example of FIG. 9. Additionally, as in the example of FIG. 9, an interface may be implemented with logic (e.g., 935, 940) to simultaneously implement and support multiple protocols. Further, in such implementations, an arbitration and multiplexer layer (e.g., 920) may be provided between the link layer (e.g., 910) and the physical layer (e.g., 915). In some implementations, each block (e.g., 915, 920, 935, 940) in the multiple protocol implementation may interface with the other block via an independent LPIF interface (e.g., 980, 985, 990). In cases where bifurcation is supported, each bifurcated port may likewise have its own independent LPIF interface, among other examples.

While examples discussed herein may reference the use of LPIF-based link layer-logical PHY interfaces, it should be appreciated that the details and principles discussed herein may be equally applied to non-LPIF interfaces. Likewise, while some examples may reference the use of common link layer-logical PHY interfaces to couple a PHY to controllers implement CXL or PCIe, other link layer protocols may also make use of such interfaces. Similarly, while some references may be made to Flex Bus physical layers, other physical layer logic may likewise be employed in some implementations and make use of common link layer-logical PHY interfaces, such as discussed herein, among other example variations that are within the scope of the present disclosure.

Figure 10:
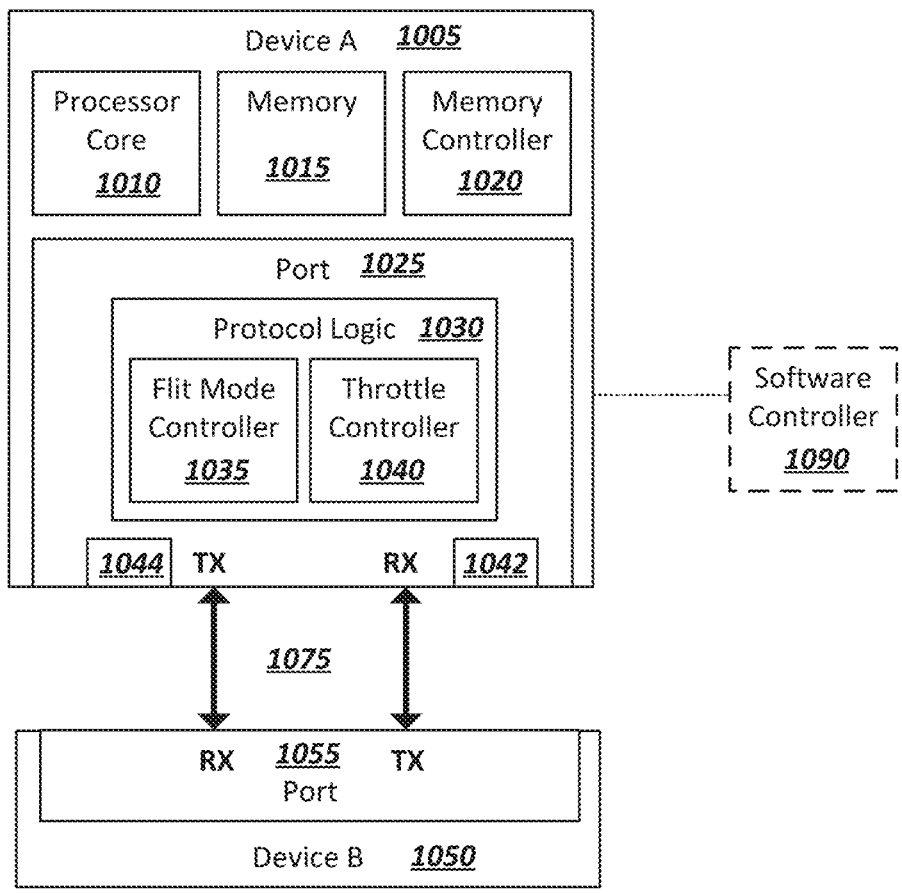
FIG. 10 illustrates a simplified block diagram of example protocol circuitry of a port.

FIG. 10 is a simplified block diagram 1000 illustrating an example implementation of a device 1005 with a port 1025 including circuitry to establish a physical communication link 1070 (e.g., according to a link training state machine defined in by an interconnect protocol) and communicate over the link 1070 with a link partner device 1050 on the other end of the link 1070 according to one or more interconnect protocols supported by the link 1070. In one example, device 1005 may include computer processing circuitry (e.g., processor core 1010), computer memory blocks (e.g., 1015) and a corresponding memory controller 1020, among other or alternative components, such as graphics processing components, tensor processing components, accelerator hardware, cache agents, etc. The port 1025 may implement a transmitter (TX) for transmitting data on the link 1070 and a corresponding receiver (RX) to received data on the link 1070. Likewise, the link partner device 1050 may include a corresponding port 1055 (e.g., with logic and features similar to port 1025 and likewise capable of supporting and communicating over the link 1070). To support training, equalizing, and otherwise establishing the link 1070 and then communicating over the link 1070 and managing link state transitions on the link 1070, the port 1025 may include protocol logic 1030 implemented at least in part in hardware circuitry to implement the logic supporting one more layered interconnect protocols (e.g., PCIe, CXL, UPI, USB, Gen-Z, etc.).

In accordance with some of the example features and solutions discussed herein, some implementations of a port (e.g., 1025) may utilize enhanced protocol logic (e.g., 1030) to implement improved features of an interconnect protocol. For instance, in some examples, protocol logic 1030 may include flit mode controller circuitry 1035 to implement multiple, alternative flit-based transport modes. For instance, the flit-based transport modes may include a standard flit-based transport mode, a latency optimized flit-based transport mode, and a partial link width optimized flit-based transport mode, among other examples. A different respective flit format may be utilized in each of the alternative modes and the flit mode controller 1035 may negotiate with a link partner device 1050 to determine which of these flit modes is mutually supported and how and when the link partners (e.g., 1005 and 1050) will transition between the flit modes during operation. For instance, a flit mode controller 1035 may identify a transition from a first active link state operating at a first link width to a second active link state operating at a different, second, narrower link width and trigger a corresponding transition to a partial link width optimized flit-based transport mode (e.g., from a standard flit-based transport mode or a latency optimized flit-based transport mode), among other examples. Such a feature may assist in mitigating the latency impacts of the narrower link width (e.g., partial link width), among other example benefits.

Additionally, some implementations of protocol logic may include throttle controller logic 1040. In some implementations, selective retry may be supported by a protocol (e.g., PCIe 6, CXL, etc.) and utilize receive and/or transmit side buffers (e.g., 1042, 1044) to implement selective retry. When a receiving device on the link (e.g., 1075) detects that a received flit (in a sequence of flits) contains an error, the receiving device may send a request over the link to replay the specific flit in error (e.g., rather than requiring the replay of not only the flit in error, but also the flits received following the flit in error (e.g., as in traditional flit retry implementations). In an example implementation of selective retry, the receiving device may request relay of the specific flit in error and buffer any following flit (e.g., in a replay buffer) that is not Idle (the Idle Flits can be dropped since they do not carry any meaningful information) and consume these buffered flits after the corrected, retried version of the specific flit in error is received. As these buffered flits are to be consumed in sequence after the flit in error is replayed, selective retry can introduce meaningful latency to not only the buffered flits, but any non-idle flit following the replayed flit in the sequence. In some implementations, periodic idle flits and/or SKP ordered sets (OS) may be sent (e.g., opportunistically or according to a defined frequency) and these moments of idle data may be leveraged to "gain back" some of this lost latency (e.g., by instead transmitting these delayed flits in place of the scheduled idle flits or SKP symbols). While the provision of idle periods in the data flow may largely guard against the accumulation of latency from selective retries, if the error rate increases, the rate of selective retries may likewise increase, quickly resulting in an untenable accumulation of latency resulting from the selective retry buffering. Accordingly, in some implementations, a throttle controller 1040 may detect (e.g., with help of a software controller (e.g., 1090) or by tracking the replay requests in hardware) an increase in flit errors and throttle or temporarily increase the frequency of idle windows in the data stream (e.g., by deliberately increasing the number or frequency of idle flits on the link, among other example solutions.

As introduced above, interconnects may support flit mode transport, utilizing defined flow control units, or flits, to encapsulate data (e.g., packet data) for transmission over a physical layer of a link. Entire packets or segments of packets may be transmitted within a single flit. Flits may be defined by the respective protocol to have a fixed length and format (e.g., with defined fields). One or more of these fields may be defined to carry an error detection or error correction code, such as a cyclic redundancy check (CRC) code, forward error correction (FEC) code, or other error correction code (ECC). For instance, PCIe 6.0 introduces Flit Mode to PCIe and defines a 256B flit size with a 3-way interleaved forward error correction (FEC) mechanism (e.g., 2 bytes each, 6 bytes total) and a strong 8-byte Reed-Solomon code-based CRC mechanism to handle the high error rates with PAM-4 signaling at 64.0 GT/s. Other protocols, such as CXL and UPI may also utilize flits (albeit with different defined formats), which include error detection and correction codes. Indeed, version of CXL (e.g., CXL3) and UPI (e.g., UPI3) are being defined to utilize a PCIe PHY (e.g., PCIe 6.0 PHY to operate at 64.0 GT/s) but with a 128B level sub-flit with 6B CRC to keep the latency impact at 0.

Figure 11A:
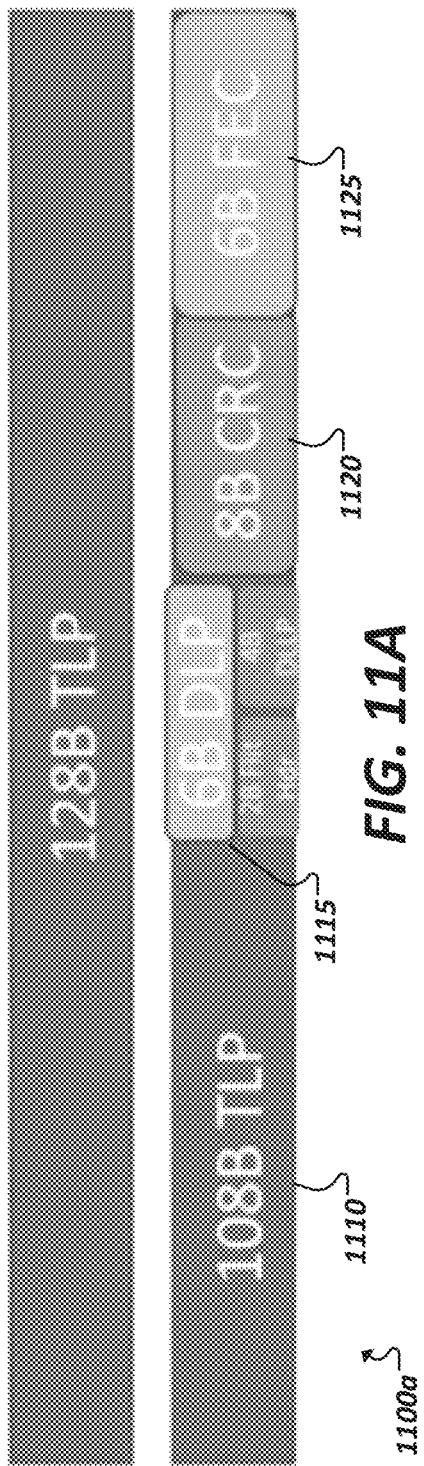
FIGS. 11A-11D illustrate representations of example standard flit formats.
Figure 11B:
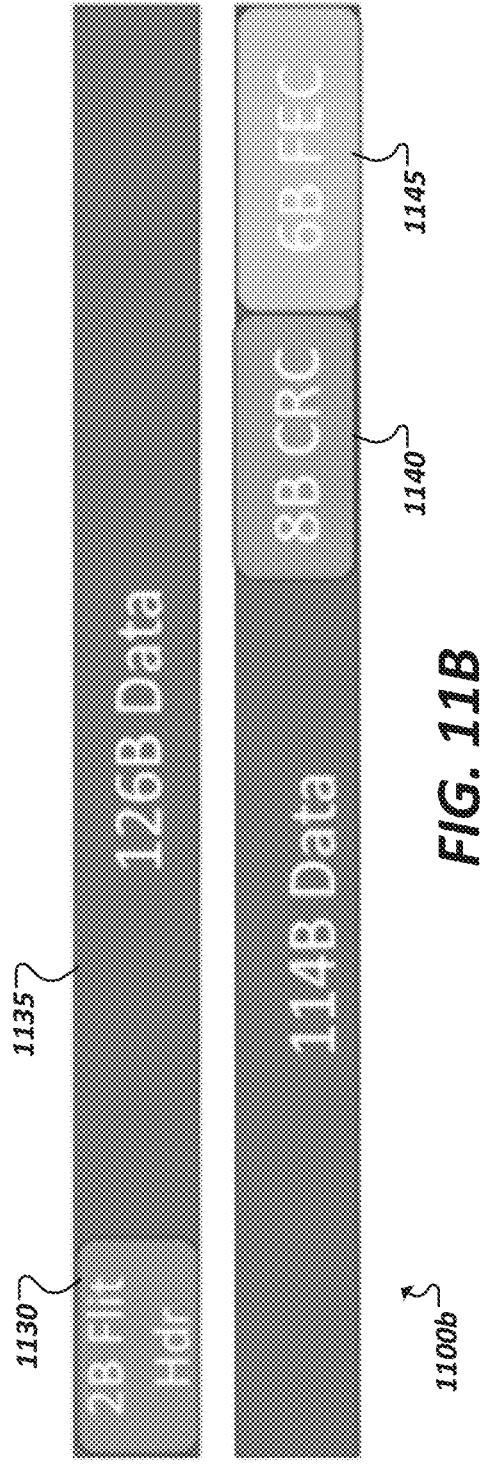

FIGS. 11A-11D are diagrams 1100*a-d* showing flit arrangements of various protocol implementations. For instance, FIG. 11A shows a representation of an example PCIe flit mode flit. The flit may have a defined length of 256B with a single error detection code provided for the entire flit. For instance, the flit 1105 may include 236B of transaction layer packet (TLP) data 1110 and 6B of data link layer packet (DLLP) data 1115, with a single error detection code (e.g., 8B CRC 1120) as well as a forward error correction code (e.g., 6B FEC 1125) calculated for the entire flit. Similarly, as shown in the example of FIG. 11B, a CXL flit format may have a 256B flit length including a 2B flit header 1130 and 240B of data 1135 covered by a single error detection codes (e.g., CRC 1140 and FEC 1145). In some implementations, forward error correction may only be performed (using the FEC code (e.g., 1145)) if a bit error is determined from the CRC. This may be advantageous, in that the latency introduced through forward error correction may be avoided in all cases other than those where it is determined to be needed (e.g., when an error is detected in the flit based on the CRC code). In other instances (e.g., in applications with more latency tolerance), forward error correction may be performed for every flit (e.g., with CRC being applied after FEC), among other example implementations.

Figure 11C:
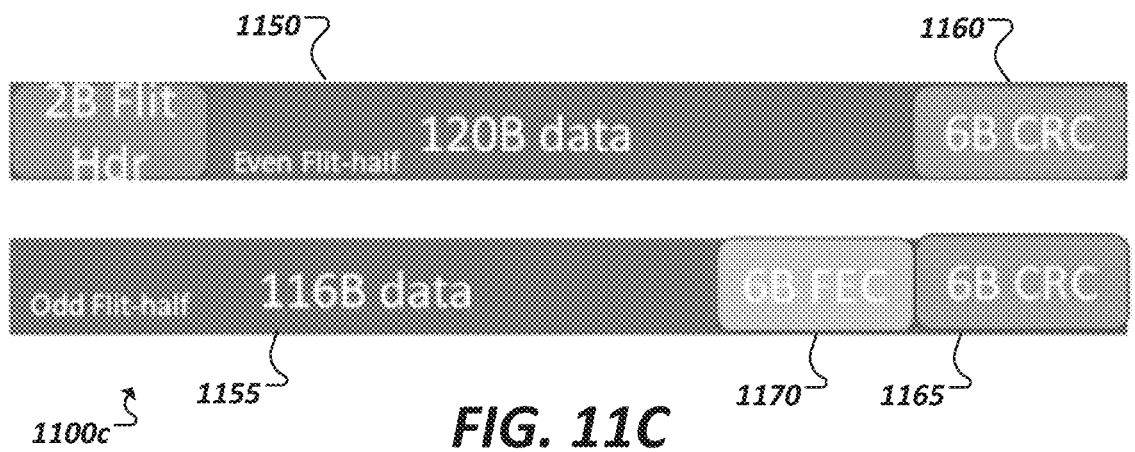
Figure 11D:
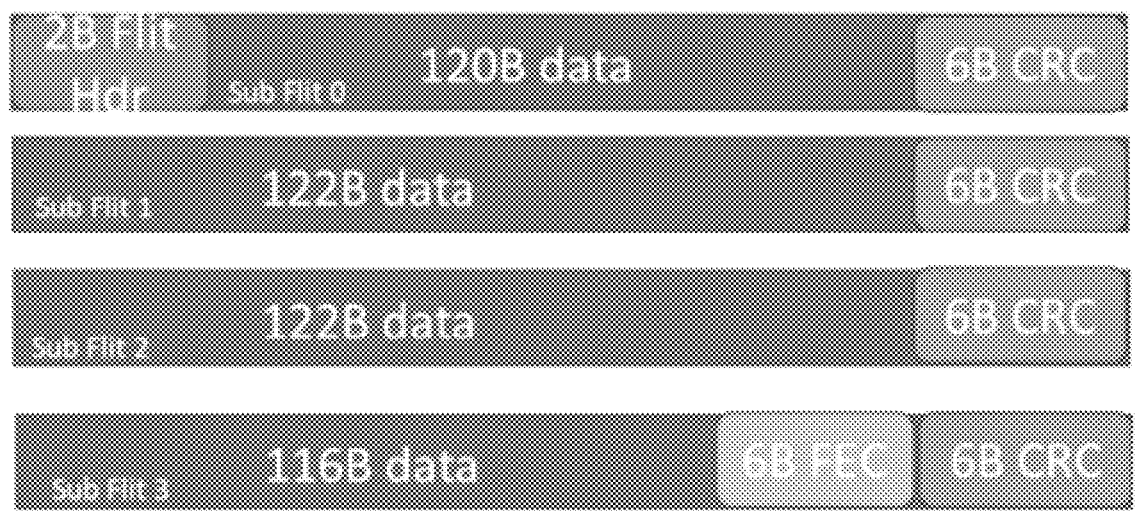

One disadvantage of a single error detection code covering the entirety of a flit is that a receiving device (e.g., using corresponding protocol circuitry (e.g., logical PHY circuitry) provided at the port of the device) must wait to receive all bytes of flit in order to perform an error check against the corresponding error detection code (e.g., the CRC) in the flit. This accumulation latency may be unacceptable in some applications. Accordingly, some implementations may employ alternative, latency optimized flit formats, such as shown in FIGS. 11C-11D, where multiple error detection codes are provided within the flit. For instance, as shown in the example of a CXL latency optimized flit format illustrated in FIG. 11C, the flit may be logically subdivided into sub-flits (e.g., first sub-flit 1150 and second sub-flit 1155) and a respective error detection code may be provided for each sub-flit 1150, 1155. For instance, the error detection code provided for the first sub-flit 1150 may be CRC 1160 and the error detection code provided for the second sub-flit 1155 may be CRC 1165 and FEC 1170. A latency optimized flit may reduce the accumulation latency as CRC checks are able to be performed after only a corresponding sub-flit has been received, allowing the preceding data (e.g., of the first sub-flit 1150) to be consumed immediately if the CRC check yields no errors in this data. FIG. 11D shows a similar latency-optimized flit structure (e.g., for UPI3), where a 512B flit is subdivided into four sub-flits, each with its own respective CRC code. In the examples of FIGS. 11C and 11D, in some implementations, if each of the CRC checks for each of the sub-flits reveals no error conditions, forward error correction for the entire flit may be skipped. However, if one or more of the CRC checks reveals an error in the associated sub-flit, forward error correction may be employed (e.g., using FEC code 1170) to attempt to correct the error, among other example implementations.

In some implementations, the state machine of an interconnect link protocol may define multiple active link states. When a link is operating in a full-width active link state (e.g., L0) it is utilizing all of the physical lanes available for the link. In some implementations, a power saving active link state may be provided that is to (e.g., temporarily) utilize less than all of the available lanes, or link width, in a partial width link state. In a partial width link state (e.g., a partial L0 or L0p state) power savings may be realized by entering a partial width state (e.g., from a full width link state or even an idle link state) where one or more available lanes of a link are made idle. Asymmetric partial width refers to each direction of a two-direction link having different widths, which may be supported in some designs. During the partial width state, transmission speed may remain the same, but the reduction in link width reduces the overall throughput rate of the link. Further, in a partial width link state, flits are sent at the narrower link width resulting in a longer transmission time than when the flit is sent in a wider width link state (e.g., L0 or a wider width partial width link state).

Thus, the latency accumulation issues discussed above (emanating from the time that it takes to accumulate data corresponding to a CRC code) are worsened in partial width link states, as the time to accumulate the data is multiplied by the reduction in link width. Indeed, with L0p, the power savings achieved are at the expense of latency. For example, a x16 link with native 256B flit has an accumulation latency of 2 ns at 64.0 GT/s and 1ns sub-flit accumulation latency for 128B sub-flits. The same link in L0p will have an accumulation latency of 4/8/16/32 ns for x8/x4/x2/x1 widths on a 256B native flit and 2/4/8/16 ns for x8/x4/x2/x1 widths on 128B sub-flits. Thus, a 256B Flit will have an additional latency added of 31 ns when moving from a x16 link width to a x1 width for a x16 Link at 64.0 GT/s, for instance. This latency impact is untenable for coherency or memory protocols where most transactions are contained within a 14B or 16B slot. For instance, a cache line data transfer comprises of 4 back-to-back 16B slots. Accordingly, in an improved implementation, a specialized flit mode may be supported, which utilizes a flit format during a partial link state that is adapted to address the latency challenges introduced through transmission on a smaller number of lanes, among other example advantages.

As introduced above, in some implementations, when a link transitions to a partial width link state utilizing fewer than a threshold number of lanes (and less than the number of lanes utilized in a full-width active link state) protocol logic of a port may transition from a first flit format to a different second flit format during the partial width state. More particularly, where the first flit format provides for a first number of error detection codes (e.g., CRC codes) to protect a data of the flit, the second flit format provides for a larger, second number of error detection codes to protect a larger number of relatively smaller segments (e.g., sub-flits) of data of the flit. As with latency optimized flits, increasing the prevalence and frequency of error detection codes specifically during partial width link states can be used to relieve the accumulation latency pressure that is worsened by the reduction in active lanes of the link.

Figure 12C:
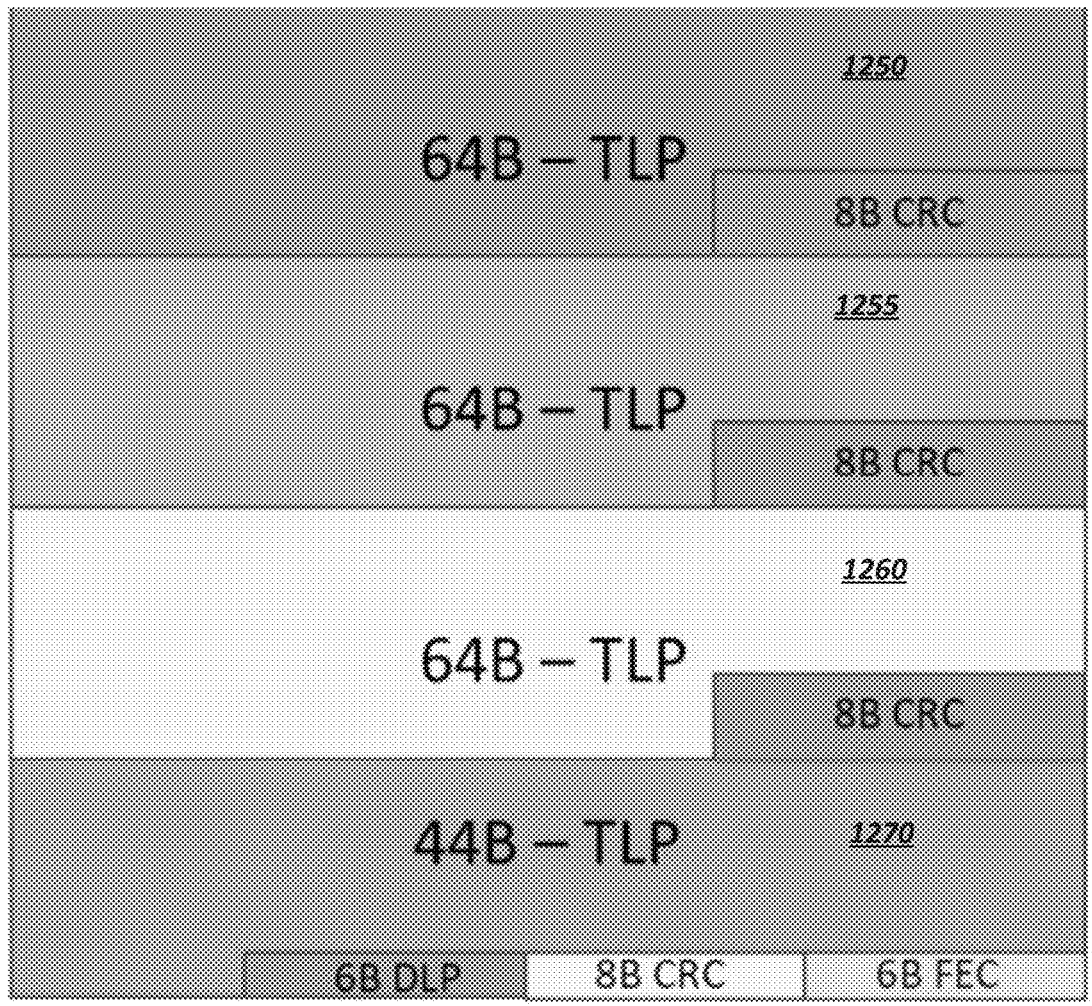

As an illustrative example, FIGS. 12A-12C show example implementations of partial width link state flit formats. Such specialized flit formats may be utilized during certain partial width link conditions, with the link partners transitions back to different standard or latency optimized flit formats when exiting the corresponding partial width link state. For instance, in FIG. 12A, an example partial width state flit format is illustrated. In the example of FIG. 12A, a latency optimized CXL flit format may be utilized when the link is active at full width (or at a relatively higher partial link width in a partial width state). The example flit format represented in FIG. 12A may represent a partial width state flit format corresponding to the latency optimized CXL flit format (e.g., similar to that shown in the example of FIG. 11C). FIG. 12A represents the partial width state flit format in tabular form 1200a, with each cell in table 1200a representing 2 bytes of data of the flit. Cells labeled S0-S14 represent the bytes of CXL flit slots numbered slots 0-14. For instance, slot 0 (S0) may be composed of 14 bytes, slot 1 (S1) of 16 bytes, and so on. The flit may include the CXL flit header (e.g., 1205). Additionally, seven instances of 6B CRC error detection codes (e.g., crc0-crc6) are provided for every 34B of slot data. For instance, the 6B CRC is applied every 40 Bytes (34 bytes of information+6B CRC) to cover two slots. The same H-matrix as (6) is used, but with 96 columns from the right to form the 3-way interleaved FEC. The payload size of this example partial width state flit may be is identical to its full-width counterpart (e.g., the example latency optimized flit in FIG. 11C) to make sure that the retry mechanism also works seamlessly as the link width changes dynamically. In the example of FIG. 12A, slots 0 and 8 are 14B each; the remaining 13 Slots are 16B each. Slot 8 is a high latency slot as it takes the full flit to accumulate. The remaining slots have an accumulation latency of 14B to 40B, which even for a single lane (x1) link is <2 ns to 5 ns. Note that even in the full-width mode with 128B sub-flits, the accumulation latency can be up to 2 ns, 4 ns, and 8 ns for link widths of x16, x8, and x4 respectively.

In the example of FIG. 12A, the increased (e.g., seven) CRC instances each protect 40B of data and represent nearly a four-fold increase in the occurrence of CRC codes within the partial width flit format as compared to the corresponding CXL latency optimized flit format (e.g., shown in FIG. 11C), which only includes two CRC code instances, each protecting 128B of data. The provision of more frequent error detection codes, however, results in the length of the partial width flit format being longer than the corresponding flit format sent in wider link width states (e.g., 288B vs. 256B). During operation, the port may utilize the first flit format (e.g., of FIG. 11C) and, upon detecting a transition to a particular partial width state, transition to instead using the corresponding partial width flit format (e.g., of FIG. 12A) while in the particular partial width state. When the particular partial width state is exited, the port and link may revert back to utilizing the more "standard" flit format (e.g., of FIG. 11C).

FIG. 12B is a tabular representation 1200b of a partial width state flit format representing a partial-width-optimized transformation of the more standard UPI3 latency optimized flit format (e.g., of FIG. 11D). For instance, for a 512B standard flit format, the corresponding partial-width-state (L0p) flit format may be 576B, using a similar layout as the that of 288B L0p flit format shown in the example of FIG. 12A. For instance, the first 13 sub-flits are 40B each (34B information, 6B CRC) each followed by a sub-flit of 50B (40B information, 4B Reserved, 6B CRC) to accommodate the 480B payload (plus 2B of flit header) and the 6B interleaved FEC. Partial width state flit formats may be defined so as to end on a clean flit or symbol boundary. Reserved fields may be provided to define a partial width state flit format with a clean flit or symbol boundary, among other example features.

In still another example of a partial width state flit format, FIG. 12C shows a representation 1200c of partial-width-optimized version of a non-latency optimized 256B Flit of PCIe 6.0 or the CXL (cf., FIGS. 11A-11B). The partial width state flit format in this example may be composed of 4 sub-flits (e.g., 1250, 1255, 1260, 1265) with an 8B CRC provided for the each of 64B TLP sub-flits (e.g., 1250, 1255, 1260) and the final sub-flit 1270 having 44B TLP, 6B DLP, 8B CRC, and 6B FEC (expanding the flit format to 280B). Thus, the first three sub-flits are 72B each and the last sub-flit is 64B. In CXL implementations, the flit header may occupy the first 2B of the first TLP sub-flit 1250, among other example implementations.

Support of specialized partial-width-optimized flit formats may be an optional feature and link partners, prior to utilizing such flit formats, may first determine whether such flit formats are mutually supported by the link partner ports and under what conditions. For instance, a configuration register may identify whether a particular device support partial-width-optimized flit formats (as well as other optional flit formats, such as latency optimized flit formats). Configuration information within the register may additionally identify the conditions under which the partial-width-optimized flit format is to or may be used. In some cases, BIOS, an operating system, or other a software-based controller may define values in the configuration register to control whether and under what conditions the partial-width-optimized flit format is to be deployed. In some implementations, link partner devices may advertise their own capabilities and/or discover the respective capabilities of their link partner during link training (e.g., during alternate protocol negotiation), including whether the partial-width-optimized flit format is supported, what threshold partial link width should trigger the use of the partial-width-optimized flit format (e.g., link widths of x4, x2, x11), among other features. Negotiation of the conditions for use of the partial-width-optimized flit format on the link may be carried out through the exchange of training sequences (e.g., TS1, TS2, or other training sequences) or ordered sets (e.g., SKP ordered sets (SKP OS)). For instance, particular fields or bits within the training sequences or ordered sets may be defined to carry information identifying support of the partial-width-optimized flit format, partial width threshold information, and other information usable to implement such features during operation of the link.

Figure 13A:
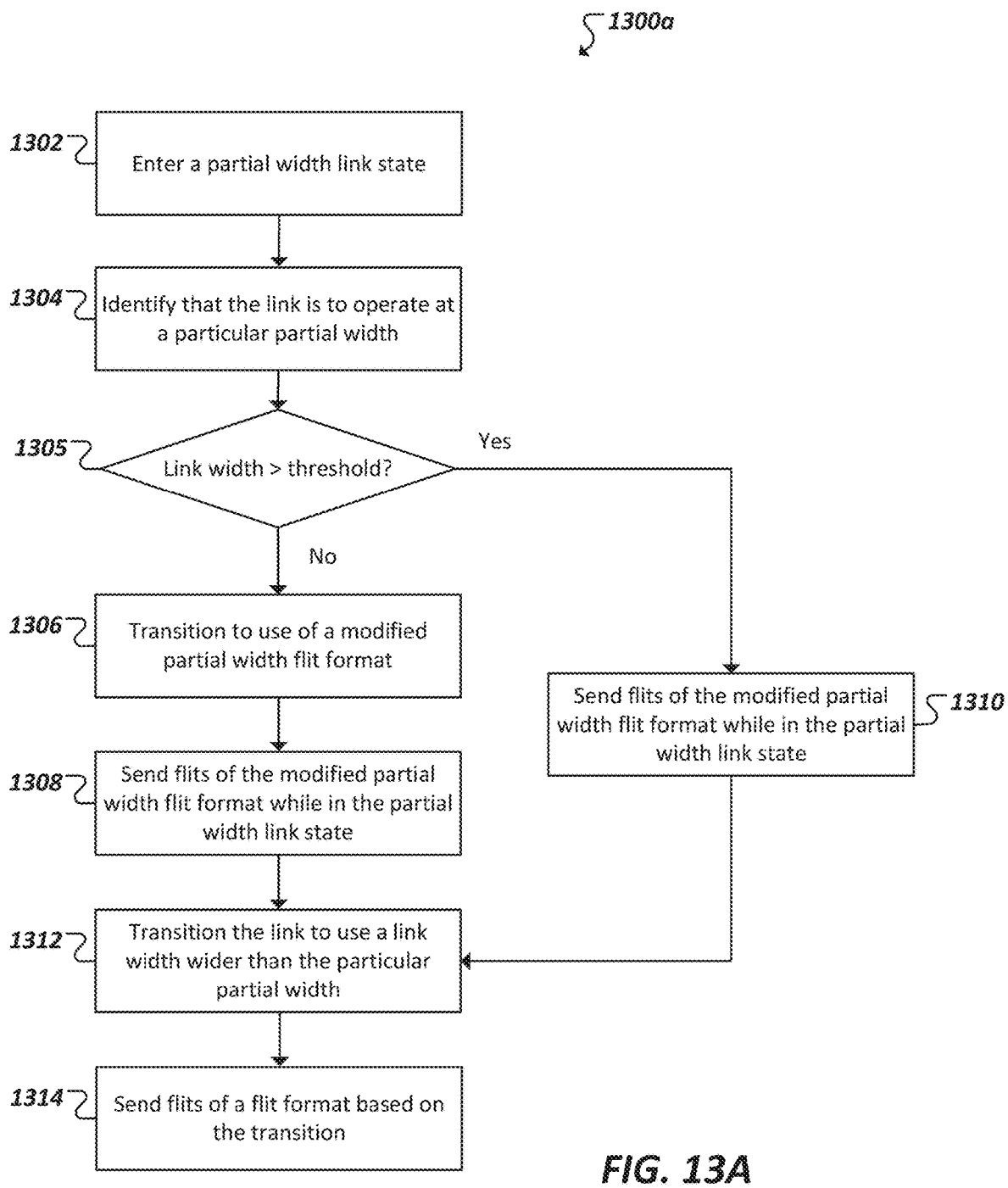
FIG. 13A is a simplified block diagram of illustrating example modified flit formats during partial width link conditions.

A variety of techniques may be utilized to enable a mode or link state, in which, in response to entry into a partial width state (or even a partial width state utilizing a link width lower than a set threshold link width), the link partners automatically identify the link width change and adjust the flit format used from a standard or default flit format to a corresponding partial-width-optimized flit format while the link remains in this partial width mode of operation. After this partial width mode of operation is exited (and a link width above a defined threshold is used) the link partners can automatically return to using the standard flit format. For instance, FIG. 13A is a flow diagram 1300a showing an example technique for transitioning between use of a standard flit format and a partial-width-optimized flit format. For instance, upon negotiating the support and use of the partial-width-optimized flit format on a link, the link may be trained to an active or operation link state. The active link state may support operation up to a particular number of lanes (supported by the physical layer of the link). A partial width link state may utilize a number of lanes fewer than this maximum number to transmit and/or receive data. For instance, a link may be configured to operate at a width of sixteen lanes (x16), but only utilizes eight (x8), four (x4), two (x2), or one (x1) lane in partial width link state(s). A partial width link state may be entered 1302 and it may be determined 1304 which of the supported partial link width the link is to operate in. Ordered sets or other data may be communicated between the link partners to negotiate a transition into the partial width link state as well as the link width to be used.

If the identified partial link width is less than (or less than or equal to, depending on the threshold definition) 1305, the link partners may each identify that the modified flit format adapted for partial width operation is to be used and may transition 1306 from using a standard flit format (e.g., a default flit format or a latency-optimized flit format adapted for use during full link width or higher link width operation) to the modified flit format. If the partial width link state utilizes a link width above the threshold partial width threshold, the link partners may continue to send and receive data (at 1310) on the link using a standard flit format (e.g., negotiated by the link partners during training). When in modified flit mode, flits may be generated and sent on the link (at 1308) according to the modified flit format and the link partner may receive the modified flit format and correctly parse and process the flit based on the mutual transition of the link partners to use of the modified flit format during the partial width link state.

The link partners may ultimately determine that the partial width link state should be modified, either by exiting the partial width link state for a full-width link state (e.g., L0) or increasing the link width used in the partial width link state, and the link partners may negotiate this transition (e.g., 1312). The flit format used on the link following the transition 1312 may change in some instances, such as where the conditions for using the modified flit format are no longer satisfied, causing the link partners to transition back to using a standard flit format, among other examples. Flits of this format may be sent and received (e.g., 1314) following this transition. In some implementations, the latency to exit or transition from a particular partial width link state (e.g., L0p) may be lowered, for instance, by beginning the transition to the higher link width as soon as the idle lanes have trained on the next flit boundary (e.g., aligned to a 16B boundary), rather than waiting for the next scheduled SKP OS (e.g., in ~1.5 us). In one example, x1 and x2 link widths, a 288B flit may be always aligned to a 16B boundary. For a x4 width, the boundary may be on every other Flit. With the Start Data Stream Ordered Set, lane to lane de-skew can be obtained across the lanes to be activated and align them to the flit boundary on the active lanes. This will result in an average width increase latency savings of 750 ns in this example, among other example implementations.

In addition to supporting modified flit formats to assist in reducing link latency emerging within partial width link states, a device (e.g., in software or hardware) may implement opportunistic self-throttling of the link to mitigate against if there is a flit that is selectively replayed to mitigate the selective replay overhead for coherency and memory interconnects. When throttling, the protocol layer sends IDLE flits even when it may have some transactions to be sent in the slots of the flit. Throttling allows the receiver to catch up from its receive-side replay buffer. For instance, some systems may support or implement a selective replay mechanism to assist in improving bandwidth utilization of a link. Traditionally, when an erroneous flit or packet is received, a replay request is sent by the receiver to trigger a replay of not only the flit that contained the error, but any other flits sent by the link partner device after this erroneous flit. With selective replay, the receiver may instead request only a replay of the erroneous flit and buffer the flits received after this flit, so that the link's bandwidth is not "wasted" by resending otherwise error-free flits (i.e., the flits following the erroneous flits that would be replayed in a traditional replay). However, this optimization of the link's bandwidth does not come without a tradeoff. Link latency may suffer during selective replay as the receiving device may be unable to consume the buffered, correct flits until the preceding replayed flit is received. The latency added by this processing delay may continue until placeholder data (e.g., SKP OS symbols, idle flits, or other non-substantive data) is received on the link that allows the receive side to "catch up" in its processing of the buffered flits.

In clearing retry buffers accumulating flits during a selective retry, idle flits, NOP flits, periodic SKP OSes, etc. may present catch-up opportunities for the receiver and allow the receive-side replay buffer to go down over time, there exists the risk that another error resulting in another selective replay will occur while the next idle flits or SKP OS is awaited and prior to the clearing of the retry buffer. Accordingly, this additional selective retry can compound the latency experienced at the receiver. Accordingly, depending on the error rate and the traffic pattern in the link (e.g., the link is under-utilized but has very few idle flits), the delay through the replay buffer can be fairly high.

In some implementations, a system may attempt to reduce link latency introduced through selective replay if the transmitter throttles its flit transmission rate after sending a selective replay flit. For instance, when the receiver issues a selective replay request (e.g., a Selective Nak) and is waiting for the selective replay, it stores valid payload flits in an RX retry buffer and processes these flits after the selective replay is received. Payload flits that arrive after the selective replay must also be stored in the RX retry buffer (e.g., in a system where all payload flits are to be processed in sequence number order). Without transmitter throttling, the RX retry buffer adds latency to the receive path since all the entries must be consumed in order. Throttling may include a transmitter selectively and strategically holding back the transmission of substantive payload flits in favor of placeholder data (e.g., idle flits, SKP OSes, etc.), which accelerate the ability of the receiver to catch up with the received flits and drains its RX retry buffer. Latency can be reduced and this performance impact can be mitigated if the transmitter throttles flit transmission earlier allowing the RX retry buffer to drain. This early transmitter throttling does not affect overall performance as the flits (e.g., carrying TLPs) that get delayed at the transmitter would have been delayed at the receiver anyway due to the processing backlog of flits stored in the RX retry buffer. Thus, performing early throttling at the transmitter allows the RX retry buffer to drain so that subsequent TLPs have reduced latency.

For selective retry, the receiver can catch up only on idle flits both for the latency optimized path as well as for the store and forward in the Receive side retry buffer. If the Link has low to moderately utilization, the receive side retry buffer could have, for instance, 100-200 ns worth of traffic (roundtrip delay of a replay) which will be the added latency for all subsequent traffic from the flit in error till 100-200 ns of idle flits or SKP Ordered Sets are communicated on the link (assuming no new errors happened). The transmitter may track the number of non-idle flits in the receiver's replay buffer. Throttling may be tuned to the drain rate of the receiver. For instance, if the Link is operating at a reduced width (e.g., due to L0p), throttling may not be needed as the RX retry buffer drain rate may be faster than the Link rate. In some implementations, a software controller may determine or forecast the traffic patterns and/or error rates affecting the link and trigger throttling in response to a selective replay, based on these detected patterns. For instance, on a selective replay request, a certain bandwidth efficiency may be enforced in each new non-idle flit transmitted by the transmitter so that the receiver retry buffer can have the opportunity to process the buffered flits and allow the receiver to bypass it.

In some implementations, a software-based controller and/or port protocol hardware may implement logic to compute a beneficial throttling rate and/or timing of such throttling. For instance, the controller or transmitter logic can assume that the initial link width is the drain rate of the receiver. On receiving a selective NAK, the transmitter can compute the number of payload flits in the receiver's RX retry buffer (or on the way to that buffer) since it knows how many payload flits are currently in its TX retry buffer. The transmitter can utilize this information to throttle or enforce a certain bandwidth efficiency (e.g., restrict the number of no operation (NOP) TLPs in a payload flit) in each new payload flit it transmits from its transaction layer to allow the receiver's RX retry buffer to drain.

As an illustrative example, two devices may be coupled by a link (e.g., an x8 link) and the first device may receive a selective NAK for a particular flit (e.g., flit number X) and the transmitter of the first device may have sent an additional four payload flits after it initially sent flit number X. In this case, the transmitter or other throttling logic of the first device may detect or estimate the latency added by RX replay buffering at the second device and may cause its upper protocol layers (e.g., the transaction or protocol layer) to reorganize data for transmission on the link to create a "bubble" of limited activity on the link corresponding to the predicted latency being experienced on the link (e.g., a four-flit bubble). For instance, for a x8 Link, in one example implementations, flits may be 16 symbols and SKP Ordered Sets may be 32 symbols, so a four-flit "bubble" (or potentially any sized bubble resulting from a selective replay event) may be constructed using such placeholder data, for instance, as either 4 NOP or Idle Flits, 2 NOP or Idle Flits and 1 SKP Ordered Set, or 2 SKP Ordered Sets. In one example, throttling logic may attempt to implement throttling at its transmitter to enforce <Y % NOP TLPs (e.g., Y=25) in its payload flits until it has sent the "bubble" to thereby allow the other device to process and clear the flits in its replay buffer before additional payload flits are sent (e.g., if TLPs are constantly being transmitted this could take 2 SKP Ordered Sets), among other example implementations.

Figure 13B:
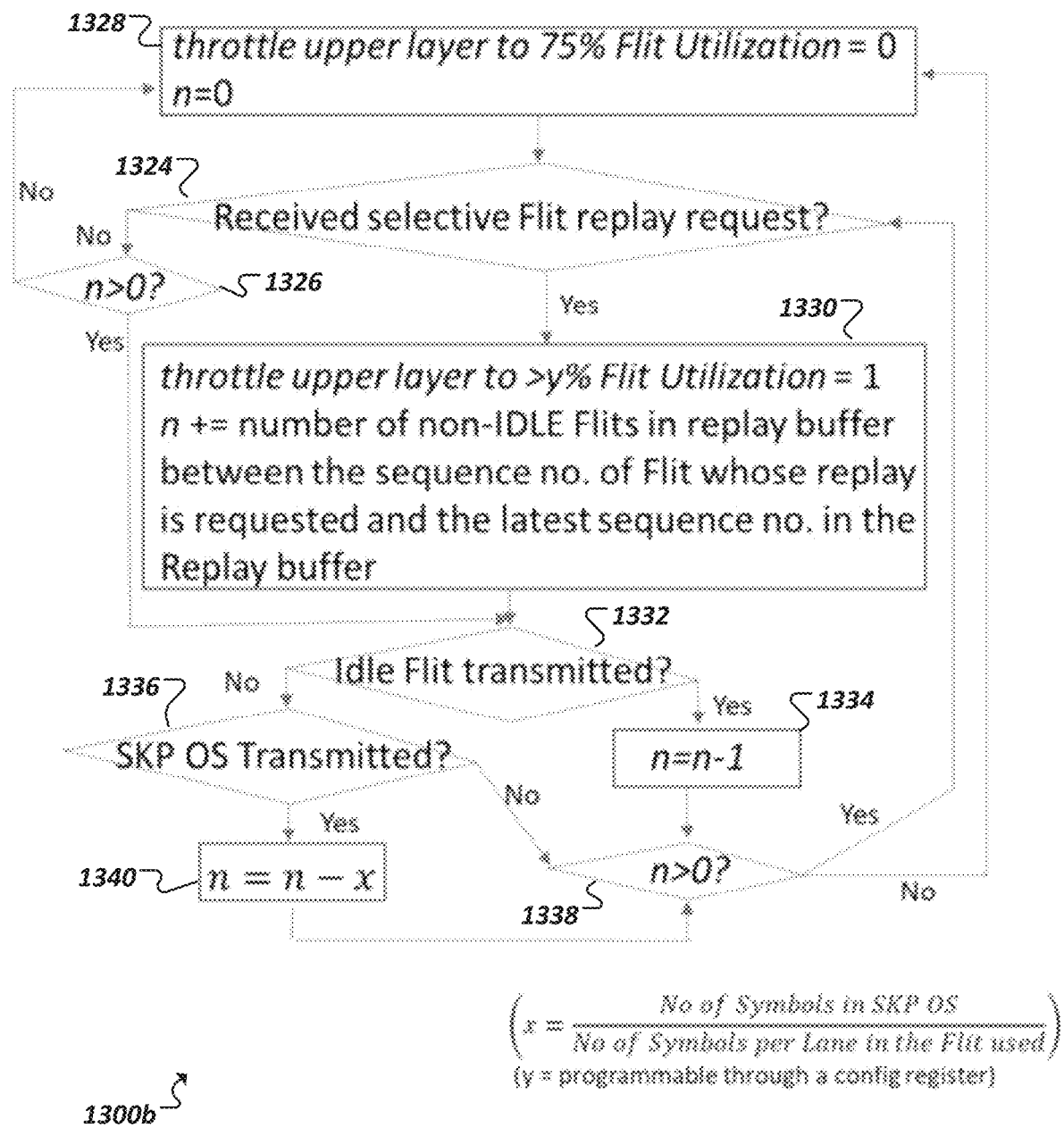
FIG. 13B is a simplified block diagram of illustrating throttling to address latency in association with a selective retry event.

FIG. 13B is a simplified flow diagram 1300b showing a technique utilized to throttle a link in association with a selective replay event. A selective flit replay request may be identified 1324. In response, logic may attempt to identify (e.g., 1330) the status of the replay buffer of the receiver at the other end of the link. Further, conditions may be defined in which throttling is enabled (e.g., by software computing an error rate, bandwidth utilization, etc. and comparing this to a threshold, etc.). The logic may track the transmission of idle flits (e.g., at 1332), SKP OS (e.g., 1336), and other placeholder data that does not add to the backlog of payload data or other substantive data that is to be consumed in order by the receiver and represents an opportunity for the receiver to consume flits stored in its retry buffer and gradually clear the buffer. Additional selective flit replay requests may also be detected while working to clear the retry buffer (e.g., at 1326). The receipt of such data may cause the logic to adjust its understanding (e.g., at 1338, 1340) of the retry buffer latency. If it is determined that the throttling has cleared the retry buffer (e.g., to end the selective replay), the throttling may be turned off (e.g., at 1328) until another qualifying selective retry event is received, among other example implementations.

Note that the apparatus', methods', and systems described above may be implemented in any electronic device or system as aforementioned. As specific illustrations, the figures below provide exemplary systems for utilizing the solutions as described herein. As the systems below are described in more detail, a number of different interconnects are disclosed, described, and revisited from the discussion above. While some of the examples above were based on UPI systems, it should be appreciated that the solutions and features discussed above may be just as readily applied to other cache coherent interconnects used to couples sockets, packages, boards, and the like within various computing platforms. As is readily apparent, the advances described above may be applied to any of the interconnects, fabrics, or architectures discussed herein, as well as other comparable interconnects, fabrics, or architectures not explicitly named or illustrated herein.

Figure 14:
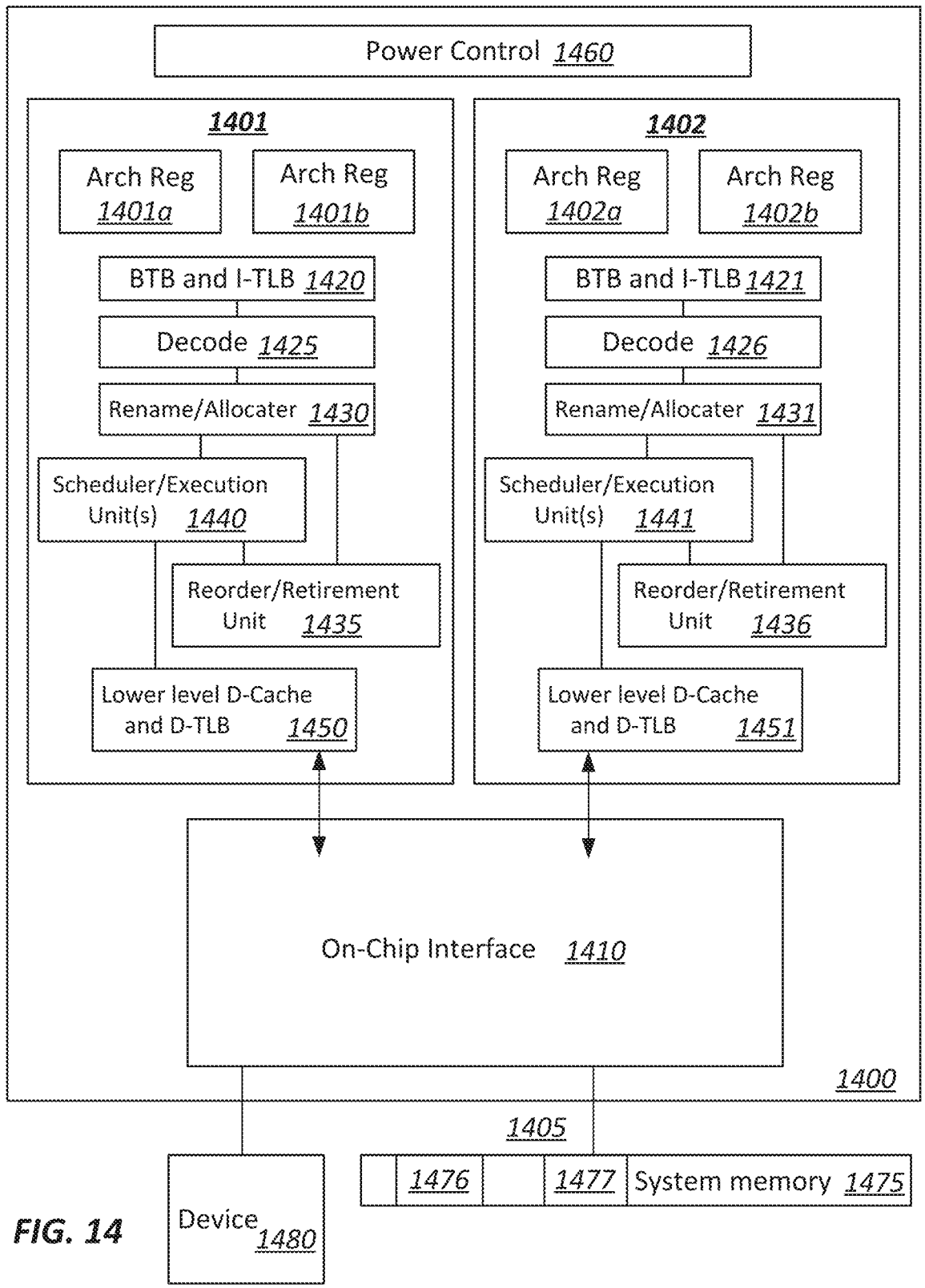
FIG. 14 illustrates an embodiment of a block diagram for a computing system including a multicore processor.

Referring to FIG. 14, an embodiment of a block diagram for a computing system including a multicore processor is depicted. Processor 1400 includes any processor or processing device, such as a microprocessor, an embedded processor, a digital signal processor (DSP), a network processor, a handheld processor, an application processor, a co-processor, a system on a chip (SOC), or other device to execute code. Processor 1400, in one embodiment, includes at least two cores—core 1401 and 1402, which may include asymmetric cores or symmetric cores (the illustrated embodiment). However, processor 1400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1400, as illustrated in FIG. 14, includes two cores—core 1401 and 1402. Here, core 1401 and 1402 are considered symmetric cores, i.e. cores with the same configurations, functional units, and/or logic. In another embodiment, core 1401 includes an out-of-order processor core, while core 1402 includes an in-order processor core. However, cores 1401 and 1402 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as a binary translation, may be utilized to schedule or execute code on one or both cores. Yet to further the discussion, the functional units illustrated in core 1401 are described in further detail below, as the units in core 1402 operate in a similar manner in the depicted embodiment.

As depicted, core 1401 includes two hardware threads 1401a and 1401b, which may also be referred to as hardware thread slots 1401a and 1401b. Therefore, software entities, such as an operating system, in one embodiment potentially view processor 1400 as four separate processors, i.e., four logical processors or processing elements capable of executing four software threads concurrently. As alluded to above, a first thread is associated with architecture state registers 1401a, a second thread is associated with architecture state registers 1401b, a third thread may be associated with architecture state registers 1402a, and a fourth thread may be associated with architecture state registers 1402b. Here, each of the architecture state registers (1401a, 1401b, 1402a, and 1402b) may be referred to as processing elements, thread slots, or thread units, as described above. As illustrated, architecture state registers 1401a are replicated in architecture state registers 1401b, so individual architecture states/ contexts are capable of being stored for logical processor 1401a and logical processor 1401b. In core 1401, other smaller resources, such as instruction pointers and renaming logic in allocator and renamer block 1430 may also be replicated for threads 1401a and 1401b. Some resources, such as re-order buffers in reorder/retirement unit 1435, ILTB 1420, load/store buffers, and queues may be shared through partitioning. Other resources, such as general purpose internal registers, page-table base register(s), low-level data-cache and data-TLB 1415, execution unit(s) 1440, and portions of out-of-order unit 1435 are potentially fully shared.

Processor 1400 often includes other resources, which may be fully shared, shared through partitioning, or dedicated by/to processing elements. In FIG. 14, an embodiment of a purely exemplary processor with illustrative logical units/ resources of a processor is illustrated. Note that a processor may include, or omit, any of these functional units, as well as include any other known functional units, logic, or firmware not depicted. As illustrated, core 1401 includes a simplified, representative out-of-order (OOO) processor core. But an in-order processor may be utilized in different embodiments. The OOO core includes a branch target buffer 1420 to predict branches to be executed/taken and an instruction-translation buffer (I-TLB) 1420 to store address translation entries for instructions.

Core 1401 further includes decode module 1425 coupled to fetch unit 1420 to decode fetched elements. Fetch logic, in one embodiment, includes individual sequencers associated with thread slots 1401a, 1401b, respectively. Usually core 1401 is associated with a first ISA, which defines/ specifies instructions executable on processor 1400. Often machine code instructions that are part of the first ISA include a portion of the instruction (referred to as an opcode), which references/specifies an instruction or operation to be performed. Decode logic 1425 includes circuitry that recognizes these instructions from their opcodes and passes the decoded instructions on in the pipeline for processing as defined by the first ISA. For example, as discussed in more detail below decoders 1425, in one embodiment, include logic designed or adapted to recognize specific instructions, such as transactional instruction. As a result of the recognition by decoders 1425, the architecture or core 1401 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1426, in one embodiment, recognize the same ISA (or a subset thereof). Alternatively, in a heterogeneous core environment, decoders 1426 recognize a second ISA (either a subset of the first ISA or a distinct ISA).

In one example, allocator and renamer block 1430 includes an allocator to reserve resources, such as register files to store instruction processing results. However, threads 1401a and 1401b are potentially capable of out-of-order execution, where allocator and renamer block 1430 also reserves other resources, such as reorder buffers to track instruction results. Unit 1430 may also include a register renamer to rename program/instruction reference registers to other registers internal to processor 1400. Reorder/retirement unit 1435 includes components, such as the reorder buffers mentioned above, load buffers, and store buffers, to support out-of-order execution and later in-order retirement of instructions executed out-of-order.

Scheduler and execution unit(s) block 1440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1450 are coupled to execution unit(s) 1440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1401 and 1402 share access to higher-level or further-out cache, such as a second level cache associated with on-chip interface 1410. Note that higher-level or further-out refers to cache levels increasing or getting further way from the execution unit(s). In one embodiment, higher-level cache is a last-level data cache—last cache in the memory hierarchy on processor 1400—such as a second or third level data cache. However, higher level cache is not so limited, as it may be associated with or include an instruction cache. A trace cache—a type of instruction cache—instead may be coupled after decoder 1425 to store recently decoded traces. Here, an instruction potentially refers to a macro-instruction (i.e. a general instruction recognized by the decoders), which may decode into a number of micro-instructions (micro-operations).

In the depicted configuration, processor 1400 also includes on-chip interface module 1410. Historically, a memory controller, which is described in more detail below, has been included in a computing system external to processor 1400. In this scenario, on-chip interface 1410 is to communicate with devices external to processor 1400, such as system memory 1475, a chipset (often including a memory controller hub to connect to memory 1475 and an I/O controller hub to connect peripheral devices), a memory controller hub, a northbridge, or other integrated circuit. And in this scenario, bus 1405 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1475 may be dedicated to processor 1400 or shared with other devices in a system. Common examples of types of memory 1475 include DRAM, SRAM, non-volatile memory (NV memory), and other known storage devices. Note that device 1480 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1400. For example in one embodiment, a memory controller hub is on the same package and/or die with processor 1400. Here, a portion of the core (an on-core portion) 1410 includes one or more controller(s) for interfacing with other devices such as memory 1475 or a graphics device 1480. The configuration including an interconnect and controllers for interfacing with such devices is often referred to as an on-core (or un-core configuration). As an example, on-chip interface 1410 includes a ring interconnect for on-chip communication and a high-speed serial point-to-point link 1405 for off-chip communication. Yet, in the SOC environment, even more devices, such as the network interface, co-processors, memory 1475, graphics processor 1480, and any other known computer devices/interface may be integrated on a single die or integrated circuit to provide small form factor with high functionality and low power consumption.

In one embodiment, processor 1400 is capable of executing a compiler, optimization, and/or translator code 1477 to compile, translate, and/or optimize application code 1476 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 15:
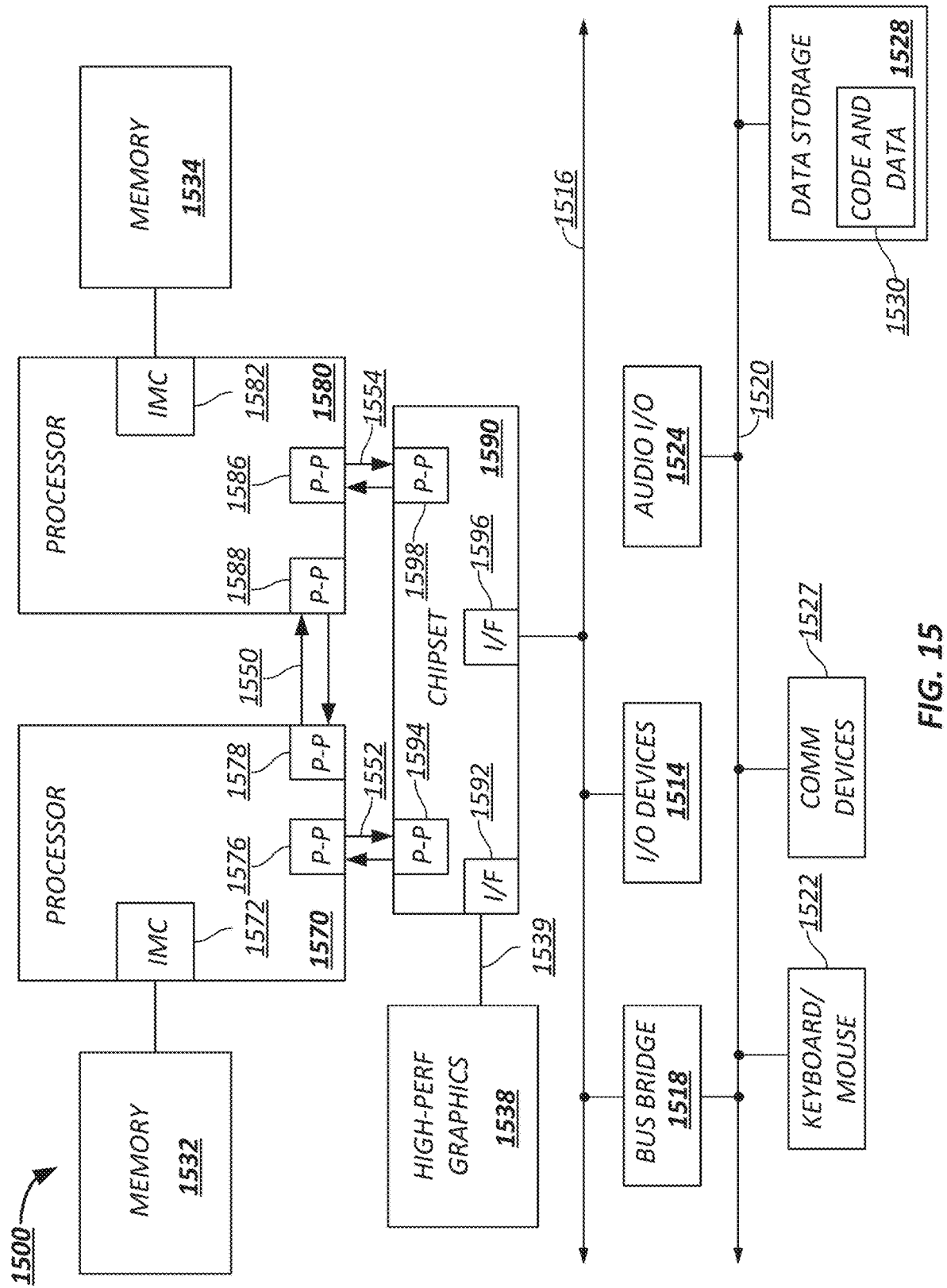
FIG. 15 illustrates an embodiment of a block for a computing system including multiple processors.

Referring now to FIG. 15, shown is a block diagram of a second system 1500 in accordance with an embodiment of the present disclosure. As shown in FIG. 15, multiprocessor system 1500 is a point-to-point interconnect system, and includes a first processor 1570 and a second processor 1580 coupled via a point-to-point interconnect 1550. Each of processors 1570 and 1580 may be some version of a processor. In one embodiment, 1552 and 1554 are part of a serial, point-to-point coherent interconnect fabric, such as a high-performance architecture. As a result, the solutions described herein may be implemented within a UPI or other architecture.

While shown with only two processors 1570, 1580, it is to be understood that the scope of the present disclosure is not so limited. In other embodiments, one or more additional processors may be present in a given processor.

Processors 1570 and 1580 are shown including integrated memory controller units 1572 and 1582, respectively. Processor 1570 also includes as part of its bus controller units point-to-point (P-P) interfaces 1576 and 1578; similarly, second processor 1580 includes P-P interfaces 1586 and 1588. Processors 1570, 1580 may exchange information via a point-to-point (P-P) interface 1550 using P-P interface circuits 1578, 1588. As shown in FIG. 15, IMCs 1572 and 1582 couple the processors to respective memories, namely a memory 1532 and a memory 1534, which may be portions of main memory locally attached to the respective processors.

Processors 1570, 1580 each exchange information with a chipset 1590 via individual P-P interfaces 1552, 1554 using point to point interface circuits 1576, 1594, 1586, 1598. Chipset 1590 also exchanges information with a high-performance graphics circuit 1538 via an interface circuit 1592 along a high-performance graphics interconnect 1539.

A shared cache (not shown) may be included in either processor or outside of both processors; yet connected with the processors via P-P interconnect, such that either or both processors' local cache information may be stored in the shared cache if a processor is placed into a low power mode.

Chipset 1590 may be coupled to a first bus 1516 via an interface 1596. In one embodiment, first bus 1516 may be a Peripheral Component Interconnect (PCI) bus, or a bus such as a PCI Express bus or another third generation I/O interconnect bus, although the scope of the present disclosure is not so limited.

As shown in FIG. 15, various I/O devices 1514 are coupled to first bus 1516, along with a bus bridge 1518 which couples first bus 1516 to a second bus 1520. In one embodiment, second bus 1520 includes a low pin count (LPC) bus. Various devices are coupled to second bus 1520 including, for example, a keyboard and/or mouse 1522, communication devices 1527 and a storage unit 1528 such as a disk drive or other mass storage device which often includes instructions/code and data 1530, in one embodiment. Further, an audio I/O 1524 is shown coupled to second bus 1520. Note that other architectures are possible, where the included components and interconnect architectures vary. For example, instead of the point-to-point architecture of FIG. 15, a system may implement a multi-drop bus or other such architecture.

While the solutions discussed herein have been described with respect to a limited number of embodiments, those skilled in the art will appreciate numerous modifications and variations therefrom. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosures.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform example embodiments herein may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including: a port including: a transmitter; and protocol circuitry to: generate a first flit according to a first flit format, where the first flit format defines that a first number of error detection codes are to be provided for an amount of data to be sent in the first flit, and the first flit is to be sent on a link by the transmitter while the link operates with a first link width, where the link couples the port to another computing device; identify a transition of the link from a first link width to a second link width, where the second link width is narrower than the first link width; and generate a second flit according to a second flit format based on the transition to the second link width, where the second flit is to be sent while the link operates at the second link width, and the second flit format defines that a second number of error detection codes are to be provided for the same amount of data to be sent in the second flit, where the second number is higher than the first number.

Example 2 includes the subject matter of example 1, where a first number of active physical lanes are to be utilized in the first link width and a second, smaller number of active physical lanes are to be utilized in the second link width.

Example 3 includes the subject matter of any one of examples 1-2, where the first flit format has a defined first length and the second flit format has a defined second length longer than the first length.

Example 4 includes the subject matter of any one of examples 1-3, where the amount of data in the first flit carries first transaction layer data and the amount of data in the second flit carries second transaction layer packet data.

Example 5 includes the subject matter of any one of examples 1-4, where the first number of error detection codes each include a respective cyclic redundancy check (CRC) code for a respective portion of the first flit, and each of the second number of error detection codes includes a respective CRC code for a respective portion of the second flit.

Example 6 includes the subject matter of example 5, where the first flit format includes a first error correction code calculated based on the amount of data of the first flit and the second flit format includes a second error correction code calculated based on the amount of data of the second flit.

Example 7 includes the subject matter of example 6, where the first error correction code includes a first forward error correction (FEC) code and the second error correction code includes a second FEC code.

Example 8 includes the subject matter of any one of examples 1-7, where the protocol circuitry is further to transition from a first active link state to a partial width active link state, and the transition from the first link width to the second link width is in association with the transition from the first active link state to the partial width active link state.

Example 9 includes the subject matter of any one of examples 1-8, where the first flit format and the second flit format are according to an interconnect protocol.

Example 10 includes the subject matter of example 9, where the interconnect protocol includes one of Peripheral Component Interconnect Express (PCIe), Compute Express Link (CXL), or UltraPath Interconnect (UPI).

Example 11 is a method including: sending flits according to a first flit format when a link operates at a first link width, where the first flit format includes a first number of cyclic redundancy check (CRC) codes to protect a first amount of data; transitioning the link from the first link width to a second link width, where the second link width includes a partial link width and the second link width is narrower than the first link width; and sending flits according to a second flit format when the link operates at the second link width, where the second flit format includes a second number of CRC codes to protect a second amount of data, the first amount of data is equal to the second amount of data, and the second number of CRC codes is larger than the first number of CRC codes.

Example 12 includes the subject matter of example 11, further including: determining that the second link width is narrower than a threshold link width; and determining that the second flit format is to be used instead of the first flit format based on the second link width being narrower than the threshold link width.

Example 13 includes the subject matter of any one of examples 11-12, further including: participating in training of the link, where the link couples a first device to a second device; determining, during training of the link, that both of the first device and the second device support use of the second flit format, where the second flit format is used at the second link width based on determining mutual support of the second flit format by the first device and second device.

Example 14 includes the subject matter of example 13, further including determining, during training of the link, a threshold link width corresponding to use of the second flit format, where the second flit format is to be used when the link width of the link is narrower the threshold link width.

Example 15 includes the subject matter of any one of examples 11-14, where both the first link width and the second link width are used in a partial width state.

Example 16 includes the subject matter of any one of examples 11-15, where the first flit format includes a first error correction code calculated based on the amount of data of the first flit and the second flit format includes a second error correction code calculated based on the amount of data of the second flit.

Example 17 includes the subject matter of example 16, where the first error correction code includes a first forward error correction (FEC) code and the second error correction code includes a second FEC code.

Example 18 includes the subject matter of any one of examples 11-17, where the first flit format and the second flit format are according to an interconnect protocol.

Example 19 includes the subject matter of example 18, where the interconnect protocol includes one of Peripheral Component Interconnect Express (PCIe), Compute Express Link (CXL), or UltraPath Interconnect (UPI).

Example 20 is a system including means to perform the method of any one of examples 11-19.

Example 21 includes the subject matter of example 20, where the means include a non-transitory machine-readable medium with instruction stored thereon, the instructions executable by a machine to cause the machine to perform at least a portion of the method of any one of examples 11-19.

Example 22 is a system including: a first device; and a second device coupled to the first device by a link, where the second device includes circuitry to: transmit first units of data to the first device on the link while the link operates at a first link width, where the first units are formatted according to a first format, the first format defines that each of the first units of data carry a particular amount of data and include a first number of error detection codes for the particular amount of data; transition from the first link width to a second link width, where a larger number of lanes are used in the first link width than in the second link width; and transmit second units of data to the first device on the link while the link operates at the second link width, where the second units of data are formatted according to a second format, the second format defines that each of the second units of data carry the particular amount of data and include a second number of error detection codes for the particular amount of data, where the second number is greater than the first number.

Example 23 includes the subject matter of example 22, where the circuitry is further to determine that the second link width is narrower than a threshold link width defined for the link, and the second format is used for units of data transmitted on the link based on determining that the second link width is narrower than the threshold link width.

Example 24 includes the subject matter of any one of examples 22-23, where the units of data include flits.

Example 25 includes the subject matter of any one of examples 22-24, where one of the first device or the second device includes a processor device.

Example 26 includes the subject matter of any one of examples 22-24, where one of the first device or the second device includes an accelerator device.

Example 27 includes the subject matter of any one of examples 22-26, where a first number of active physical lanes are to be utilized in the first link width and a second, smaller number of active physical lanes are to be utilized in the second link width.

Example 28 includes the subject matter of any one of examples 22-27, where the amount of data in the first unit carries first transaction layer data and the amount of data in the second unit carries second transaction layer packet data.

Example 29 includes the subject matter of any one of examples 22-28, where the first format has a defined first length and the second format has a defined second length longer than the first length.

Example 30 includes the subject matter of any one of examples 22-29, where the first number of error detection codes each include a respective cyclic redundancy check (CRC) code for a respective portion of the first unit, and each of the second number of error detection codes includes a respective CRC code for a respective portion of the second unit.

Example 31 includes the subject matter of example 30, where the first format includes a first error correction code calculated based on the amount of data of the first unit and the second format includes a second error correction code calculated based on the amount of data of the second unit.

Example 32 includes the subject matter of example 31, where the first error correction code includes a first forward error correction (FEC) code and the second error correction code includes a second FEC code.

Example 33 includes the subject matter of any one of examples 22-32, where the protocol circuitry is further to transition from a first active link state to a partial width active link state, and the transition from the first link width to the second link width is in association with the transition from the first active link state to the partial width active link state.

Example 34 includes the subject matter of any one of examples 22-33, where the first format and the second format are according to an interconnect protocol.

Example 35 includes the subject matter of example 34, where the interconnect protocol includes one of Peripheral Component Interconnect Express (PCIe), Compute Express Link (CXL), or UltraPath Interconnect (UPI).

Example 36 is a method including: determining characteristics of a link, where the link couples a first device to a second device; identifying a selective retry request to retry transmission of a particular flit in a stream of flits based on an error detected in the particular flit; determining a latency accumulated through buffering of flits in a retry buffer based on the selective retry request; and throttling traffic on the link to assist in clearing the retry buffer.

Example 37 includes the subject matter of example 36, where the link is compliant with a PCIe-based protocol.

Example 38 includes the subject matter of any one of examples 36-37, where the characteristics include a predicted bandwidth availability for the link.

Example 39 includes the subject matter of any one of examples 36-38, where the characteristics include a predicted error rate for the link.

Example 40 includes the subject matter of any one of examples 36-39, where the characteristics are determined by software.

Example 41 is a system including means to perform the method of any one of examples 36-40.

Example 42 includes the subject matter of example 41, where the means include a non-transitory machine-readable medium with instruction stored thereon, the instructions executable by a machine to cause the machine to perform at least a portion of the method of any one of examples 36-40.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a port comprising:
  a transmitter; and
  protocol circuitry to:
    generate a first flit according to a first flit format, wherein the first flit format defines that a first number of error detection codes are to be provided for an amount of data to be sent in the first flit, and the first flit is to be sent on a link by the transmitter while the link operates with a first link width, wherein the link couples the port to another computing device;
    identify a transition of the link from a first link width to a second link width, wherein the second link width is narrower than the first link width; and
    generate a second flit according to a second flit format based on the transition to the second link width, wherein the second flit is to be sent while the link operates at the second link width, and the second flit format defines that a second number of error detection codes are to be provided for the same amount of data to be sent in the second flit, wherein the second number is higher than the first number.

2. The apparatus of claim 1, wherein a first number of active physical lanes are to be utilized in the first link width and a second, smaller number of active physical lanes are to be utilized in the second link width.

3. The apparatus of claim 1, wherein the amount of data in the first flit carries first transaction layer data and the amount of data in the second flit carries second transaction layer packet data.

4. The apparatus of claim 1, wherein the first flit format has a defined first length and the second flit format has a defined second length longer than the first length.

5. The apparatus of claim 1, wherein the first number of error detection codes each comprise a respective cyclic redundancy check (CRC) code for a respective portion of the first flit, and each of the second number of error detection codes comprises a respective CRC code for a respective portion of the second flit.

6. The apparatus of claim 5, wherein the first flit format includes a first error correction code calculated based on the amount of data of the first flit and the second flit format includes a second error correction code calculated based on the amount of data of the second flit.

7. The apparatus of claim 6, wherein the first error correction code comprises a first forward error correction (FEC) code and the second error correction code comprises a second FEC code.

8. The apparatus of claim 1, wherein the protocol circuitry is further to transition from a first active link state to a partial width active link state, and the transition from the first link width to the second link width is in association with the transition from the first active link state to the partial width active link state.

9. The apparatus of claim 1, wherein the first flit format and the second flit format are according to an interconnect protocol.

10. The apparatus of claim 9, wherein the interconnect protocol comprises one of Peripheral Component Interconnect Express (PCIe), Compute Express Link (CXL), or UltraPath Interconnect (UPI).

11. A method comprising:
sending flits according to a first flit format when a link operates at a first link width, wherein the first flit format comprises a first number of cyclic redundancy check (CRC) codes to protect a first amount of data;
transitioning the link from the first link width to a second link width, wherein the second link width comprises a partial link width and the second link width is narrower than the first link width;
sending flits according to a second flit format when the link operates at the second link width, wherein the second flit format comprises a second number of CRC codes to protect a second amount of data, the first amount of data is equal to the second amount of data, and the second number of CRC codes is larger than the first number of CRC codes.

12. The method of claim 11, further comprising:
determining that the second link width is narrower than a threshold link width; and
determining that the second flit format is to be used instead of the first flit format based on the second link width being narrower than the threshold link width.

13. The method of claim 11, further comprising:
participating in training of the link, wherein the link couples a first device to a second device;
determining, during training of the link, that both of the first device and the second device support use of the second flit format, wherein the second flit format is used at the second link width based on determining mutual support of the second flit format by the first device and second device.

14. The method of claim 13, further comprising determining, during training of the link, a threshold link width corresponding to use of the second flit format, wherein the second flit format is to be used when the link width of the link is narrower the threshold link width.

15. The method of claim 11, wherein both the first link width and the second link width are used in a partial width state.

16. A system comprising:
a first device; and
a second device coupled to the first device by a link, wherein the second device comprises circuitry to:
transmit first units of data to the first device on the link while the link operates at a first link width, wherein the first units are formatted according to a first format, the first format defines that each of the first units of data carry a particular amount of data and include a first number of error detection codes for the particular amount of data;
transition from the first link width to a second link width, wherein a larger number of lanes are used in the first link width than in the second link width; and
transmit second units of data to the first device on the link while the link operates at the second link width, wherein the second units of data are formatted according to a second format, the second format defines that each of the second units of data carry the particular amount of data and include a second number of error detection codes for the particular amount of data, wherein the second number is greater than the first number.

17. The system of claim 16, wherein the circuitry is further to determine that the second link width is narrower than a threshold link width defined for the link, and the second format is used for units of data transmitted on the link based on determining that the second link width is narrower than the threshold link width.

18. The system of claim 16, wherein the units of data comprise flits.

19. The system of claim 16, wherein one of the first device or the second device comprises a processor device.

20. The system of claim 16, wherein one of the first device or the second device comprises an accelerator device.

* * * * *